(12) United States Patent
Hasegawa

(10) Patent No.: US 12,249,458 B2
(45) Date of Patent: Mar. 11, 2025

(54) MULTILAYER CERAMIC ELECTRONIC COMPONENT INCLUDING METAL TERMINALS, EXTERIOR MATERIAL, AND ELECTROSTATIC SHIELDING METAL

(71) Applicant: Murata Manufacturing Co., Ltd., Nagaokakyo (JP)

(72) Inventor: Naotaka Hasegawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 143 days.

(21) Appl. No.: 17/954,380

(22) Filed: Sep. 28, 2022

(65) Prior Publication Data

US 2023/0108549 A1 Apr. 6, 2023

(30) Foreign Application Priority Data

Oct. 4, 2021 (JP) .................................. 2021-163481

(51) Int. Cl.
*H01G 2/22* (2006.01)
*H01G 4/224* (2006.01)
(Continued)

(52) U.S. Cl.
CPC .............. *H01G 2/22* (2013.01); *H01G 4/224* (2013.01); *H01G 4/232* (2013.01); *H01G 4/30* (2013.01)

(58) Field of Classification Search
CPC .. H01G 2/22; H01G 4/30; H01G 2/06; H01G 2/065; H01G 4/005; H01G 4/12;
(Continued)

(56) References Cited

U.S. PATENT DOCUMENTS 6,046,902 A * 4/2000 Nakagawa ............. H01G 4/232
361/309
6,885,538 B1 * 4/2005 Ishii ....................... H05K 3/301
361/308.1
(Continued)

FOREIGN PATENT DOCUMENTS

JP        S5734354 A       2/1982
JP        S6265802 U  *    4/1987
(Continued)

OTHER PUBLICATIONS

Office Action in JP2021-163481, mailed Feb. 27, 2024, 4 pages.
(Continued)

*Primary Examiner* — Nathan Milakovich
*Assistant Examiner* — Daniel M Dubuisson
(74) *Attorney, Agent, or Firm* — Keating & Bennett, LLP

(57) ABSTRACT

A multilayer ceramic electronic component includes a multilayer ceramic electronic component main body, first and second metal terminals, an exterior material covering the multilayer ceramic electronic component main body, a portion of the first metal terminal, and a portion of the second metal terminal, and an electrostatic shielding metal embedded in the exterior material and covering at least a portion of the multilayer ceramic electronic component main body. The electrostatic shielding metal is between a surface of the exterior material and a surface of the multilayer ceramic electronic component main body, and is spaced away from the multilayer ceramic electronic component main body.

20 Claims, 28 Drawing Sheets

(51) Int. Cl.
*H01G 4/232* (2006.01)
*H01G 4/30* (2006.01)

(58) Field of Classification Search
CPC ........ H01G 4/1227; H01G 4/40; H01G 4/224; H01G 4/232
See application file for complete search history.

(56) References Cited

U.S. PATENT DOCUMENTS

| | | | |
|---|---|---|---|
| 2012/0327555 A1* | 12/2012 | Ahn | H01G 4/232 |
| | | | 361/321.1 |
| 2016/0126015 A1* | 5/2016 | Park | H01G 4/12 |
| | | | 361/301.4 |
| 2018/0130603 A1* | 5/2018 | Chong | H01B 1/02 |
| 2018/0374640 A1* | 12/2018 | Akiyoshi | H01G 4/30 |
| 2019/0043662 A1* | 2/2019 | Yamamoto | H01G 4/12 |
| 2019/0096581 A1* | 3/2019 | Masoleh | H01G 4/30 |
| 2019/0259533 A1 | 8/2019 | Na | |
| 2019/0379343 A1* | 12/2019 | Miyahara | H01G 4/224 |
| 2020/0402714 A1* | 12/2020 | Yoon | H01G 2/22 |
| 2020/0402715 A1* | 12/2020 | Yoon | H01G 2/065 |
| 2021/0082627 A1* | 3/2021 | Kim | H05K 1/181 |

FOREIGN PATENT DOCUMENTS

| | | |
|---|---|---|
| JP | H01278052 A | 11/1989 |
| JP | H06252292 A | 9/1994 |
| JP | 2002313669 A | 10/2002 |
| JP | 2002367850 A | 12/2002 |
| JP | 2006319014 A | 11/2006 |
| JP | 2007158046 A | 6/2007 |
| JP | 2010027900 A | 2/2010 |
| JP | 2019-145767 A | 8/2019 |

OTHER PUBLICATIONS

Notice of Reasons for Refusal in JP2021-163481, mailed May 21, 2024, 7 pages.
Official Communication issued in corresponding Chinese Patent Application No. 202210902361.X, mailed on Nov. 8, 2024, 7 pages.

* cited by examiner

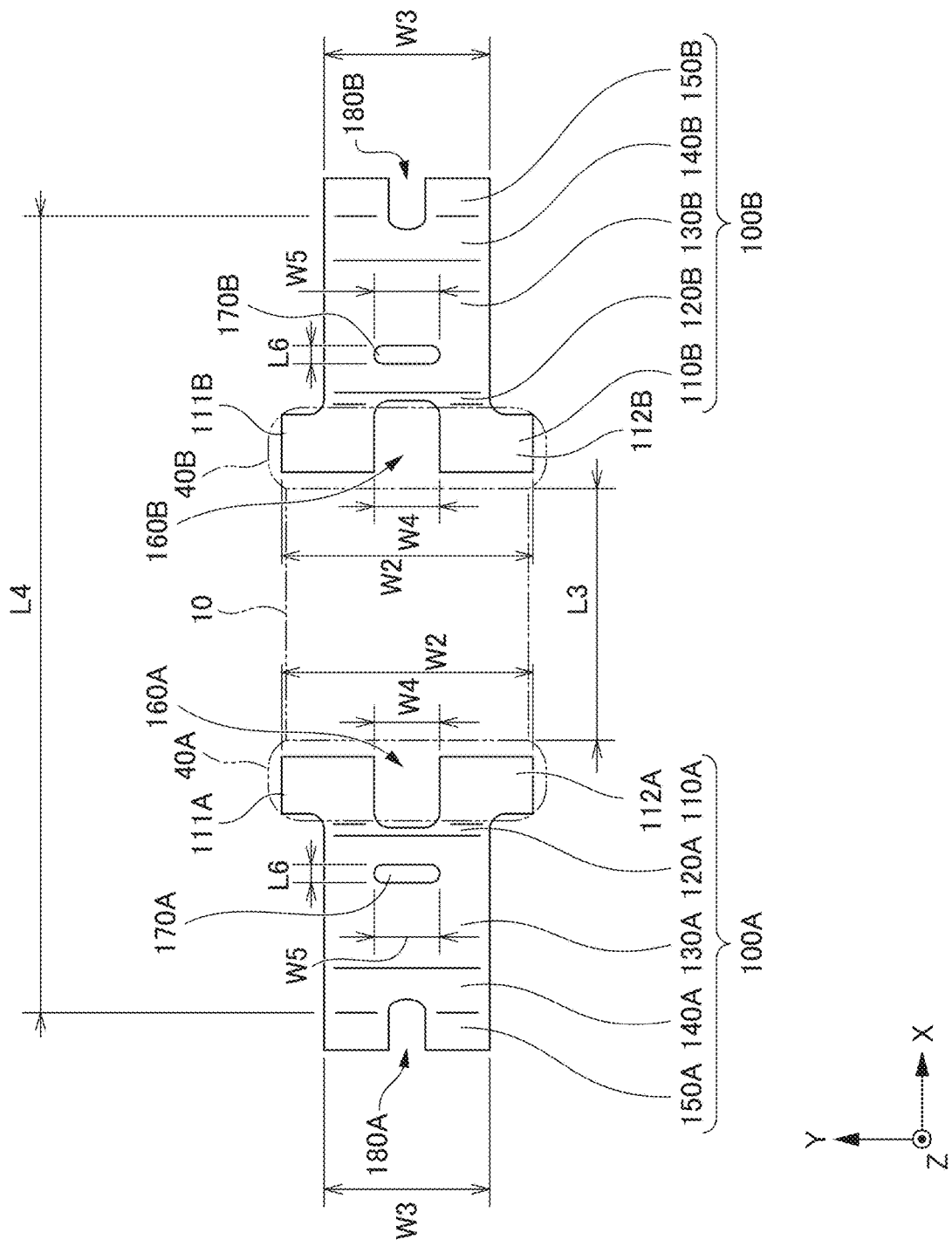

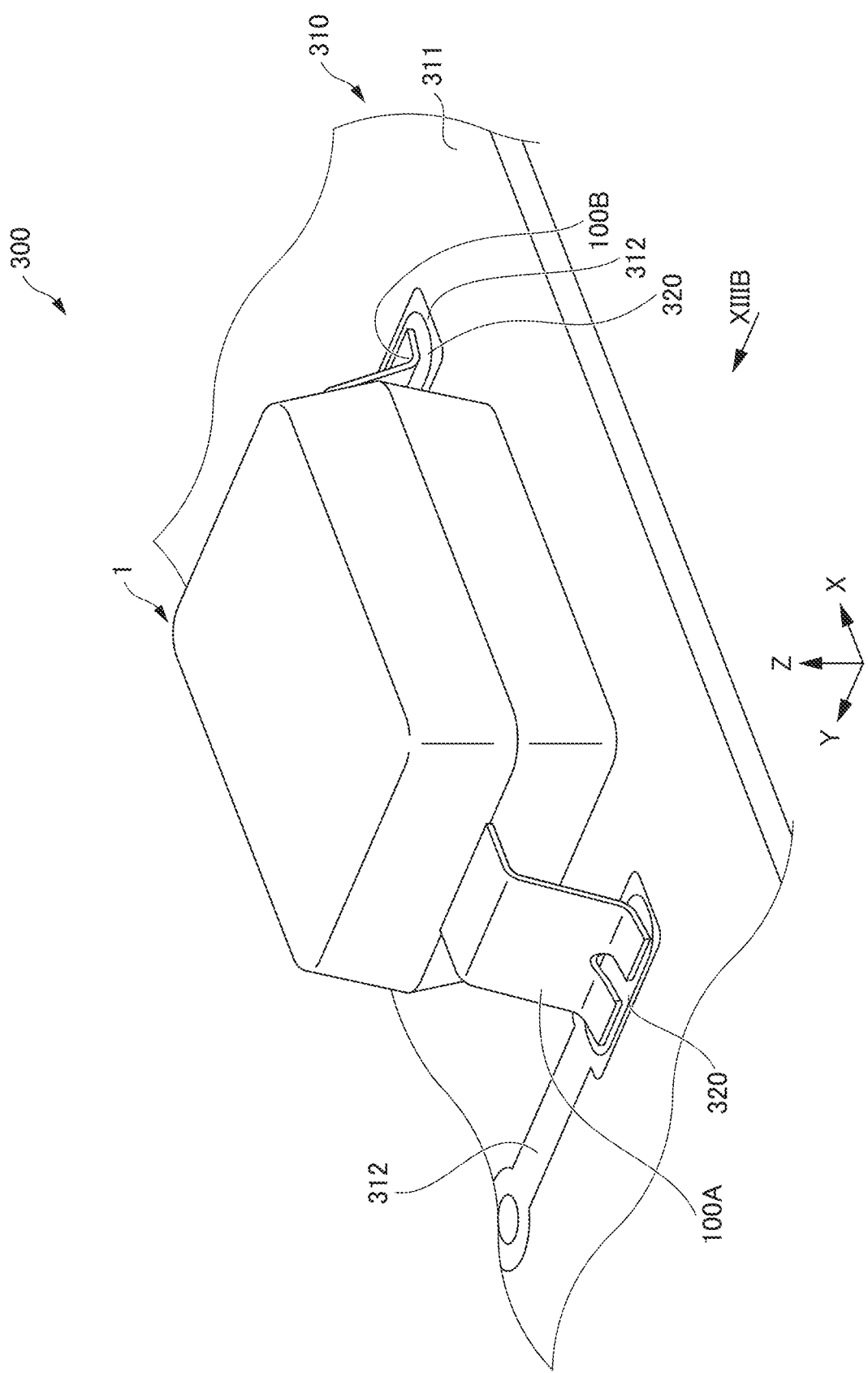

MULTILAYER CERAMIC ELECTRONIC COMPONENT INCLUDING METAL TERMINALS, EXTERIOR MATERIAL, AND ELECTROSTATIC SHIELDING METAL

CROSS REFERENCE TO RELATED APPLICATIONS

This application is based on and claims the benefit of priority from Japanese Patent Application No. 2021-163481, filed on Oct. 4, 2021. The entire contents of this application are hereby incorporated herein by reference.

BACKGROUND OF THE INVENTION

1. Field of the Invention

The present invention relates to a multilayer ceramic electronic component

2. Description of the Related Art

Conventionally, a multilayer ceramic electronic component covered with a resin functioning as an exterior material has been known. In such a multilayer ceramic electronic component, metal terminals extending to the outside of the exterior material, and the external electrodes provided on the surface of a main body of the multilayer ceramic electronic component are bonded in the interior of the exterior material by a bonding material including a metal such as solder (see Japanese Unexamined Patent Application Publication No. 2019-145767, for example).

Such a multilayer ceramic electronic component has a disadvantage in that, for example, creeping discharge is likely to occur due to leakage of an electric field generated in the electronic component to the surroundings.

SUMMARY OF THE INVENTION

Preferred embodiments of the present invention provide multilayer ceramic electronic components that are each able to reduce or prevent leakage of an electric field generated in the electronic component to the surroundings.

A multilayer ceramic electronic component according to a preferred embodiment of the present invention includes a multilayer ceramic electronic component main body including a multilayer body, a first external electrode, and a second external electrode, the multilayer body including a plurality of laminated ceramic layers and a plurality of internal conductive layers laminated on the ceramic layers, and further including a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, the first external electrode being provided on the first end surface side, and the second external electrode being provided on the second end surface side, a first metal terminal connected to the first external electrode, and a second metal terminal connected to the second external electrode, the multilayer ceramic electronic component further including an exterior material that covers the multilayer ceramic electronic component main body, a portion of the first metal terminal, and a portion of the second metal terminal, and an electrostatic shielding metal that is embedded in the exterior material and covers at least a portion of the multilayer ceramic electronic component main body, in which the electrostatic shielding metal is provided between a surface of the exterior material and a surface of the multilayer ceramic electronic component main body, and is provided at a position spaced away from the multilayer ceramic electronic component main body.

According to preferred embodiments of the present invention, it is possible to provide multilayer ceramic electronic components that are each able to reduce or prevent leakage of an electric field generated in the electronic component to the surroundings.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a view corresponding to FIG. 4, and is a view showing a metal terminal when the exterior material and the multilayer ceramic capacitor main body are excluded.

FIG. 17 is an external perspective view showing a mounting structure in which a multilayer ceramic capacitor according to a preferred embodiment of the present invention is mounted on a mounting board.

DETAILED DESCRIPTION OF THE PREFERRED EMBODIMENTS

Figure 1:
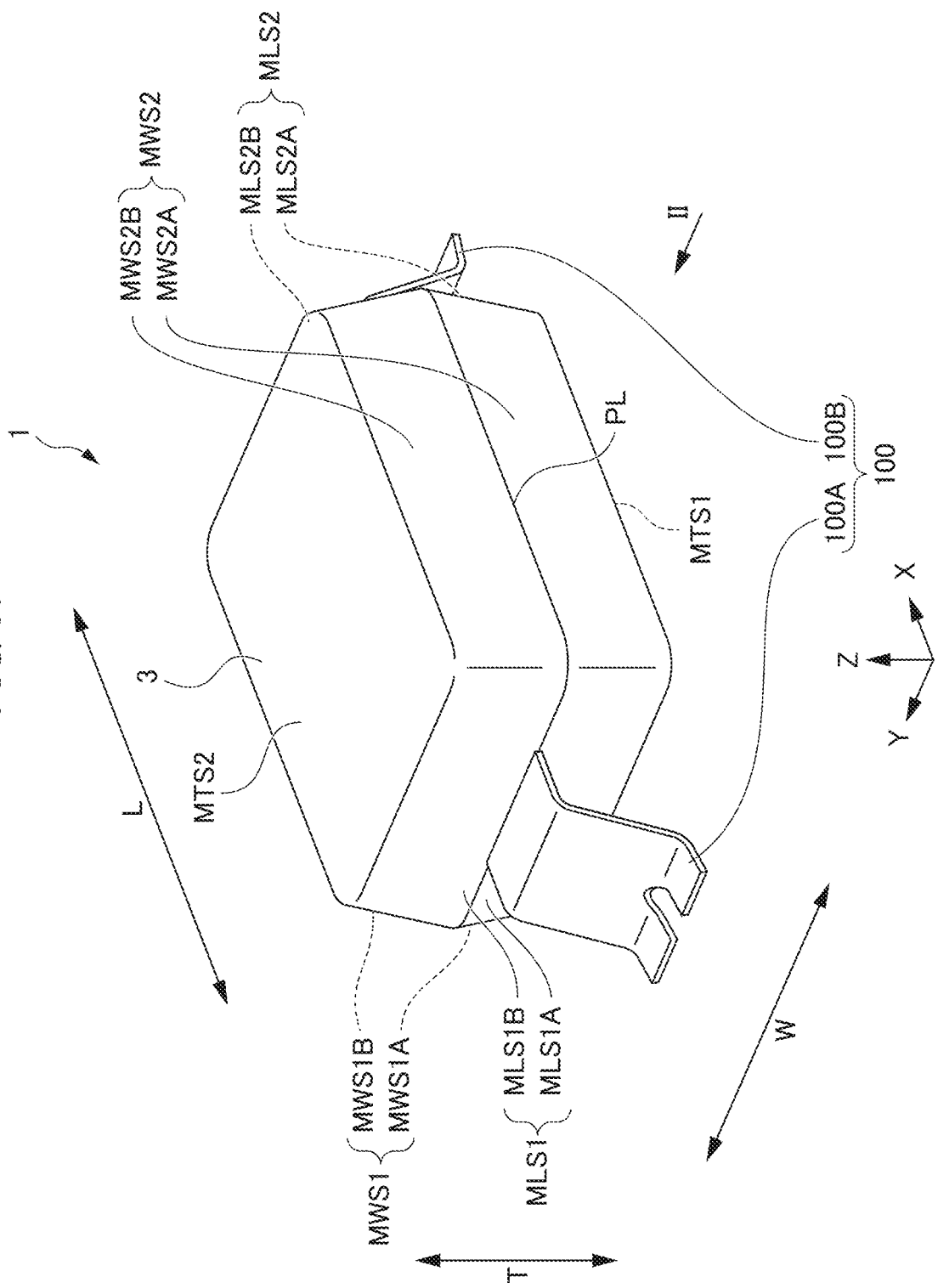
FIG. 1 is an external perspective view of a multilayer ceramic capacitor according to a preferred embodiment of the present invention.
Figure 2:
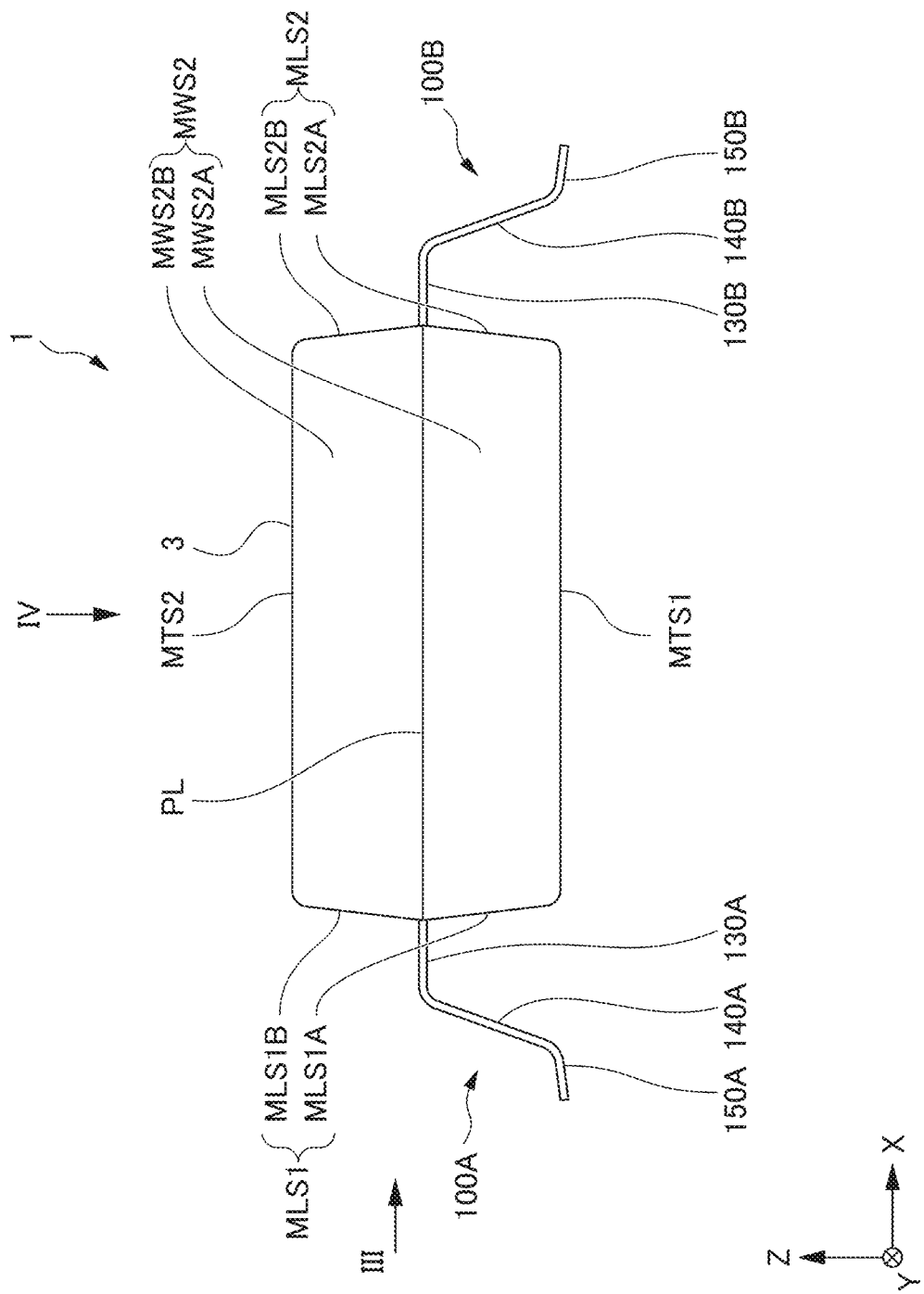
FIG. 2 is an arrow view when the multilayer ceramic capacitor of FIG. 1 is viewed in the direction of the arrow II.
Figure 3:
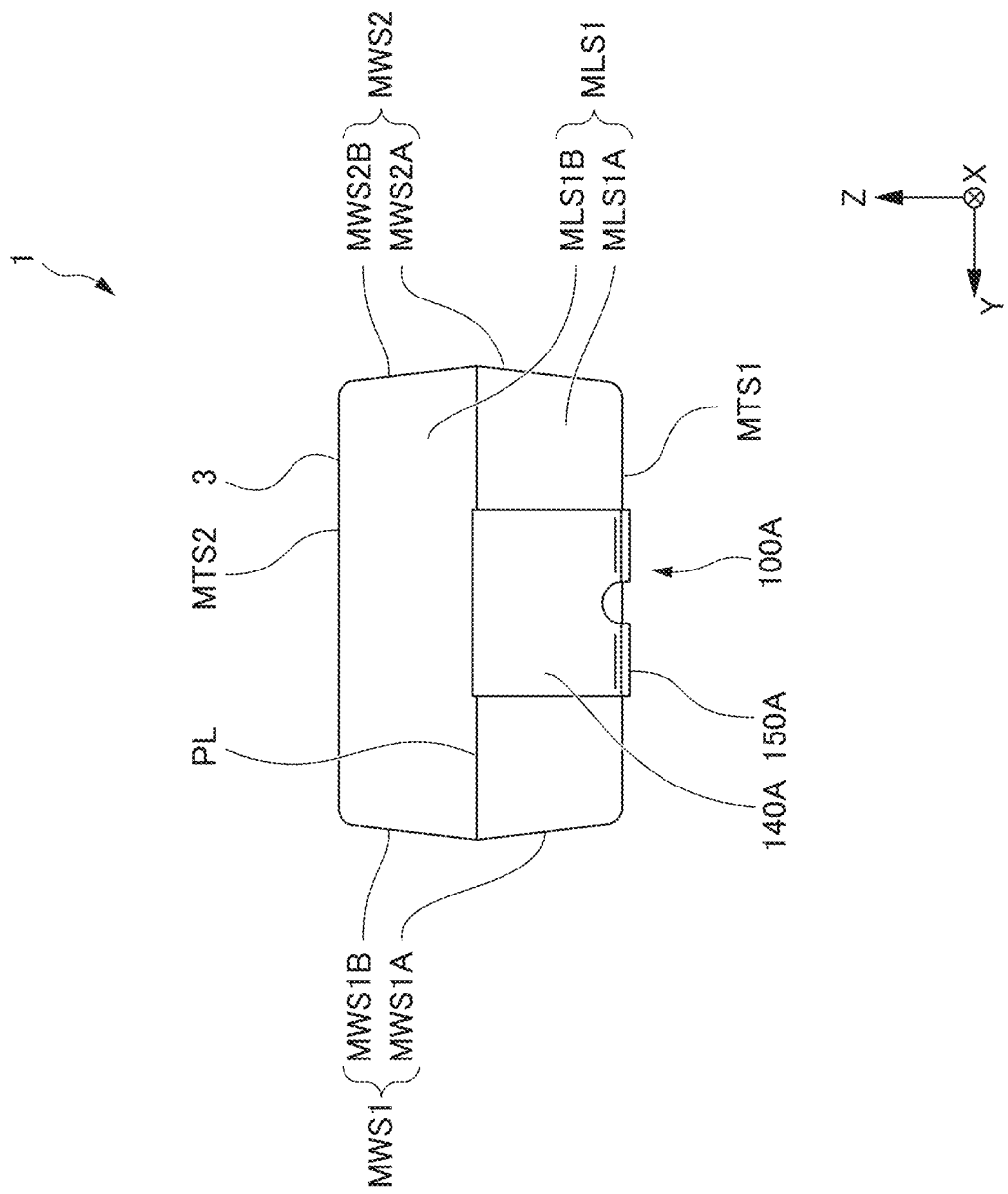
FIG. 3 is an arrow view when the multilayer ceramic capacitor of FIG. 2 is viewed in the direction of the arrow III.
Figure 4:
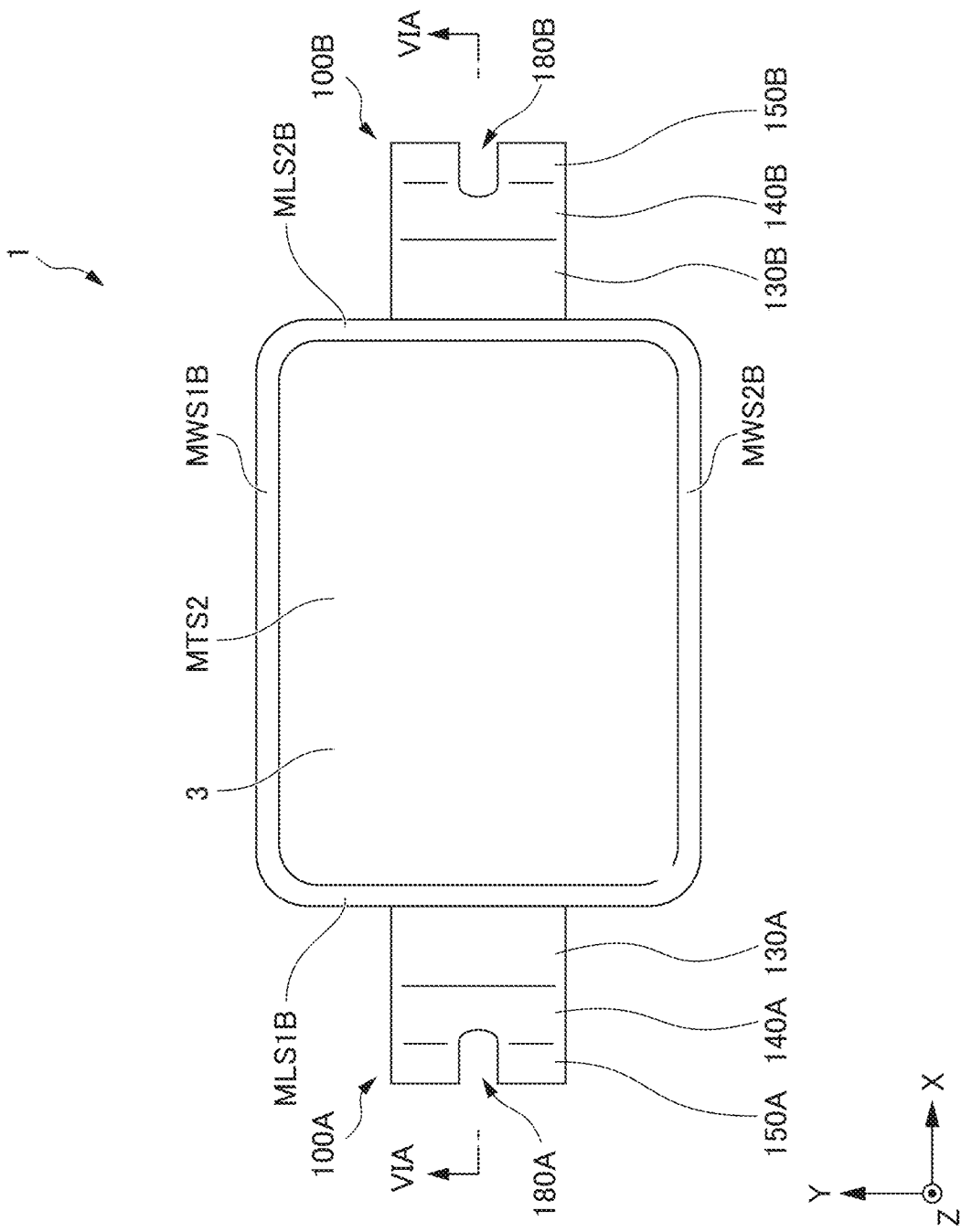
FIG. 4 is an arrow view when the multilayer ceramic capacitor of FIG. 2 is viewed in the direction of the arrow IV.
Figure 5:
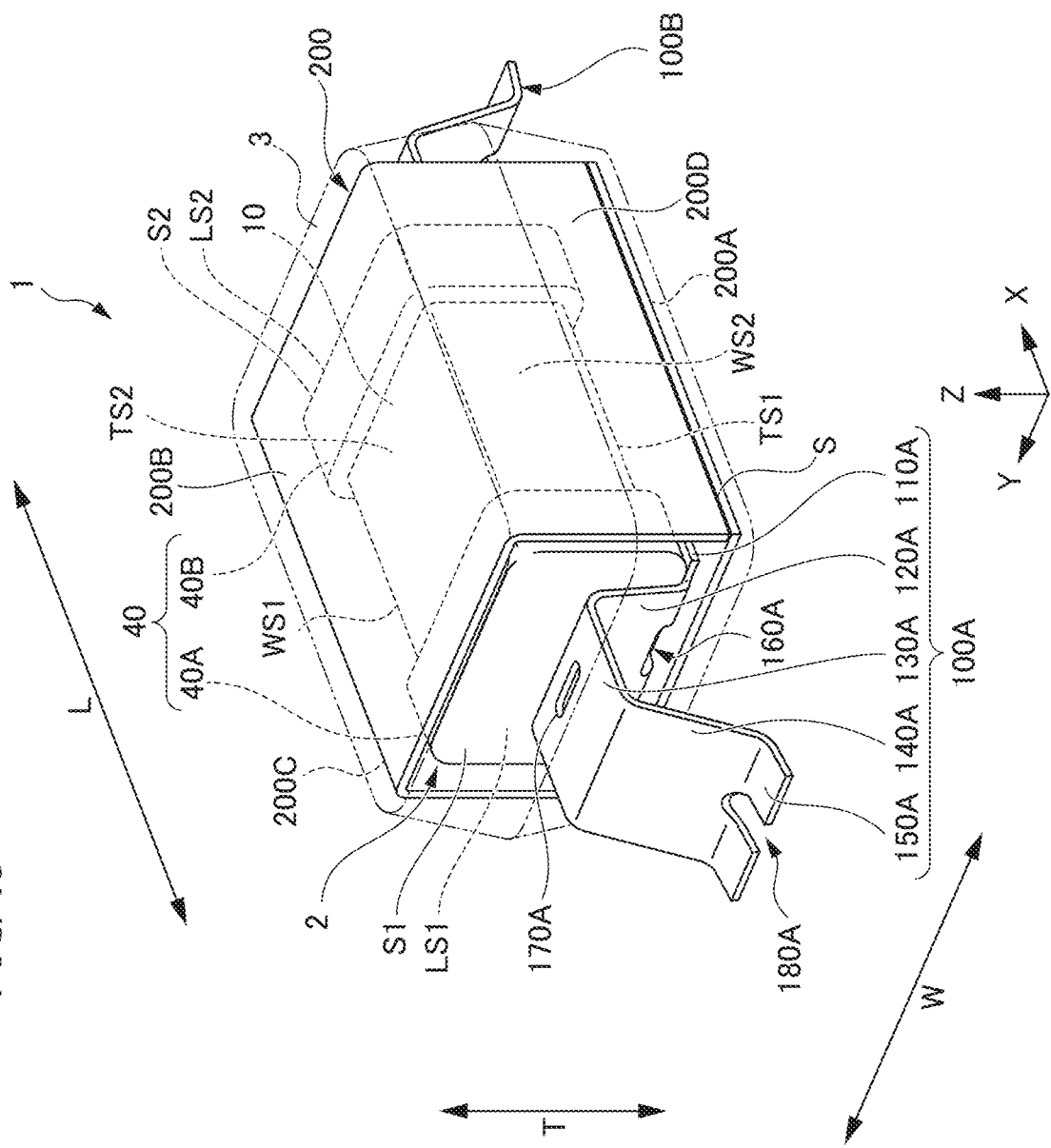
FIG. 5 is a diagram corresponding to FIG. 1, and is a virtual perspective view for explaining an internal structure of the multilayer ceramic capacitor.
Figure 6A:
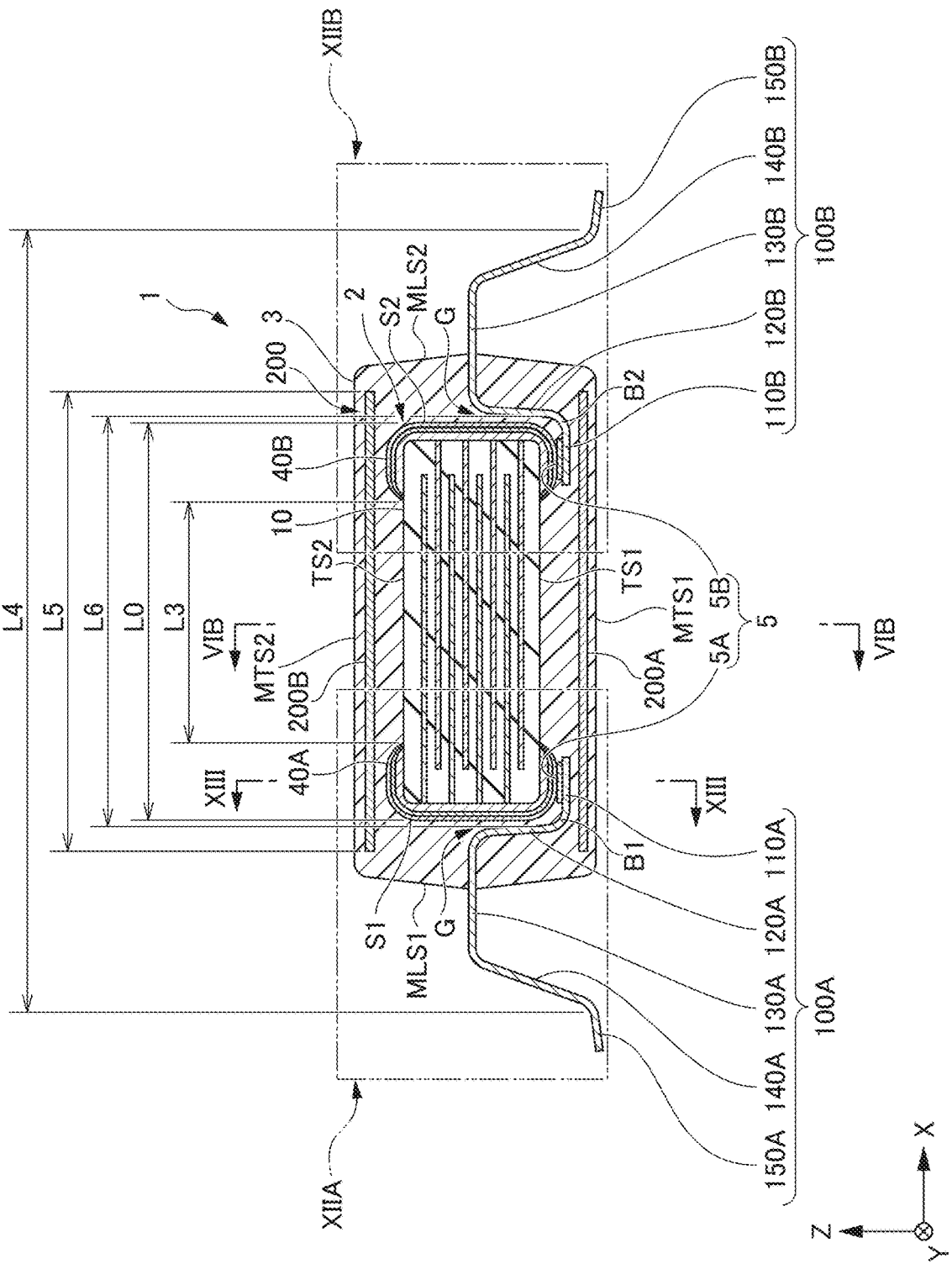
FIG. 6A is a cross-sectional view taken along the line VIA-VIA of the multilayer ceramic capacitor 1 of FIG. 4.
Figure 6B:
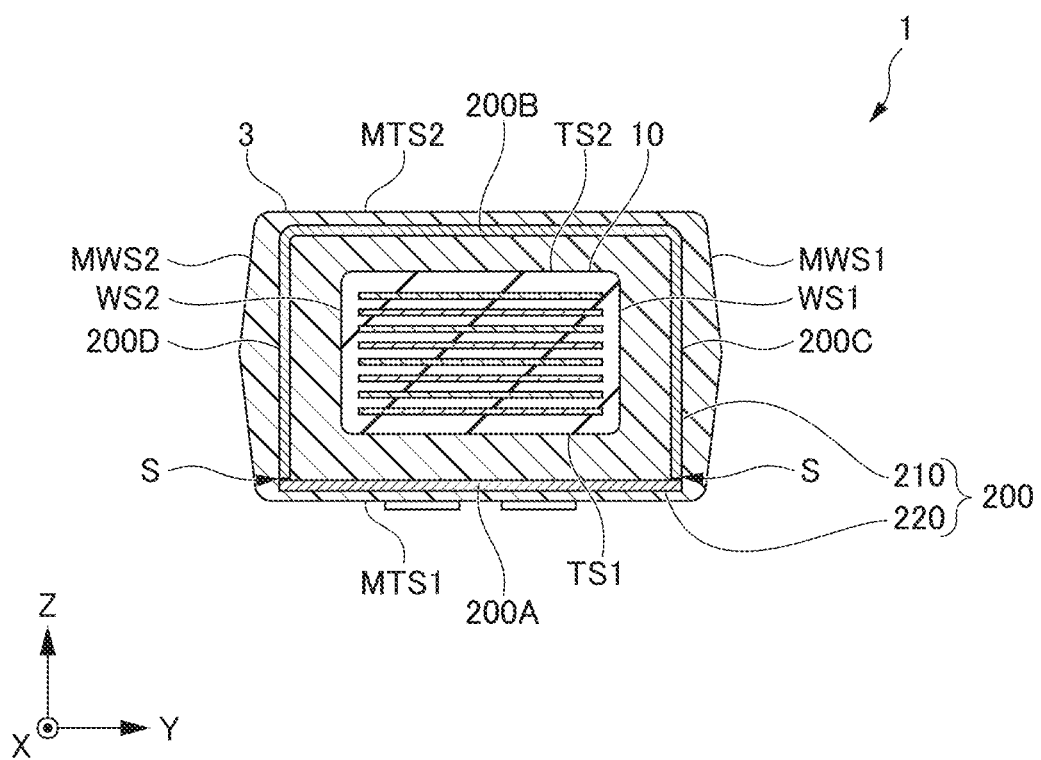
FIG. 6B is a cross-sectional view taken along the line VIB-VIB of the multilayer ceramic capacitor 1 of FIG. 6A.

Hereinafter, a multilayer ceramic capacitor 1 as an example of a multilayer ceramic electronic component according to a preferred embodiment of the present invention will be described. FIG. 1 is an external perspective view of the multilayer ceramic capacitor 1. FIG. 2 is an arrow view when the multilayer ceramic capacitor 1 of FIG. 1 is viewed in the direction of the arrow II. FIG. 3 is an arrow view when the multilayer ceramic capacitor 1 of FIG. 2 is viewed in the direction of the arrow III. FIG. 4 is an arrow view when the multilayer ceramic capacitor 1 of FIG. 2 is viewed in the direction of the arrow IV. FIG. 5 is a diagram corresponding to FIG. 1, and is a virtual perspective view for explaining an internal structure of the multilayer ceramic capacitor 1. FIG. 6A is a cross-sectional view taken along the line VIA-VIA of the multilayer ceramic capacitor 1 of FIG. 4. FIG. 6B is a cross-sectional view taken along the line VIB-VIB of the multilayer ceramic capacitor 1 of FIG. 6A.

The multilayer ceramic capacitor 1 includes a multilayer ceramic capacitor main body 2 defining and functioning as a multilayer ceramic electronic component main body, a metal terminal 100, an exterior material 3, and an electrostatic shielding metal 200. Since the multilayer ceramic capacitor main body 2 is covered with the exterior material 3, it is not shown in FIGS. 1 to 4. FIGS. 5 to 6B show the multilayer ceramic capacitor main body 2 and the electrostatic shielding metal 200.

Figure 7:
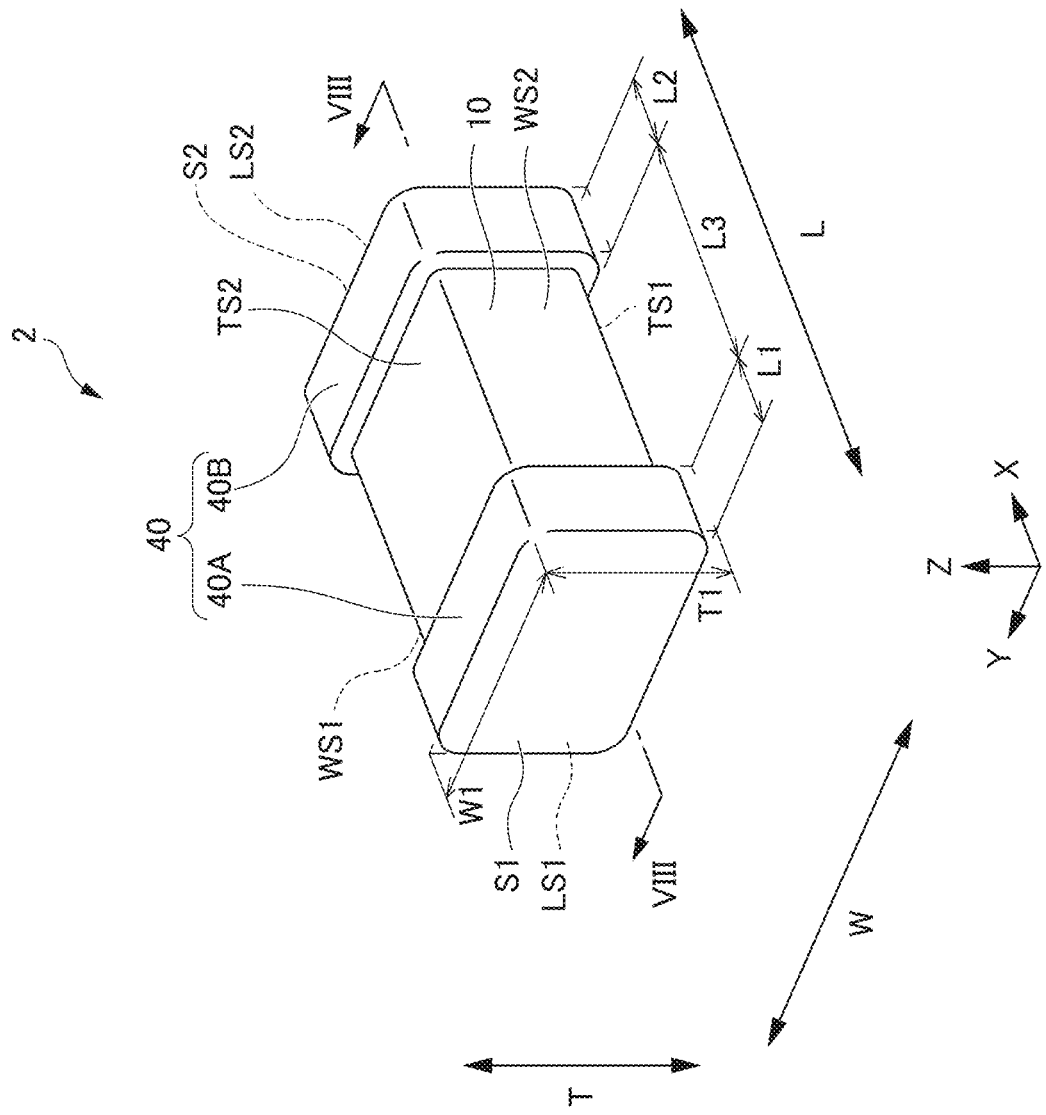
FIG. 7 is an external perspective view showing the appearance of a multilayer ceramic capacitor main body before being covered with an exterior material and before a metal terminal is attached.
Figure 8:
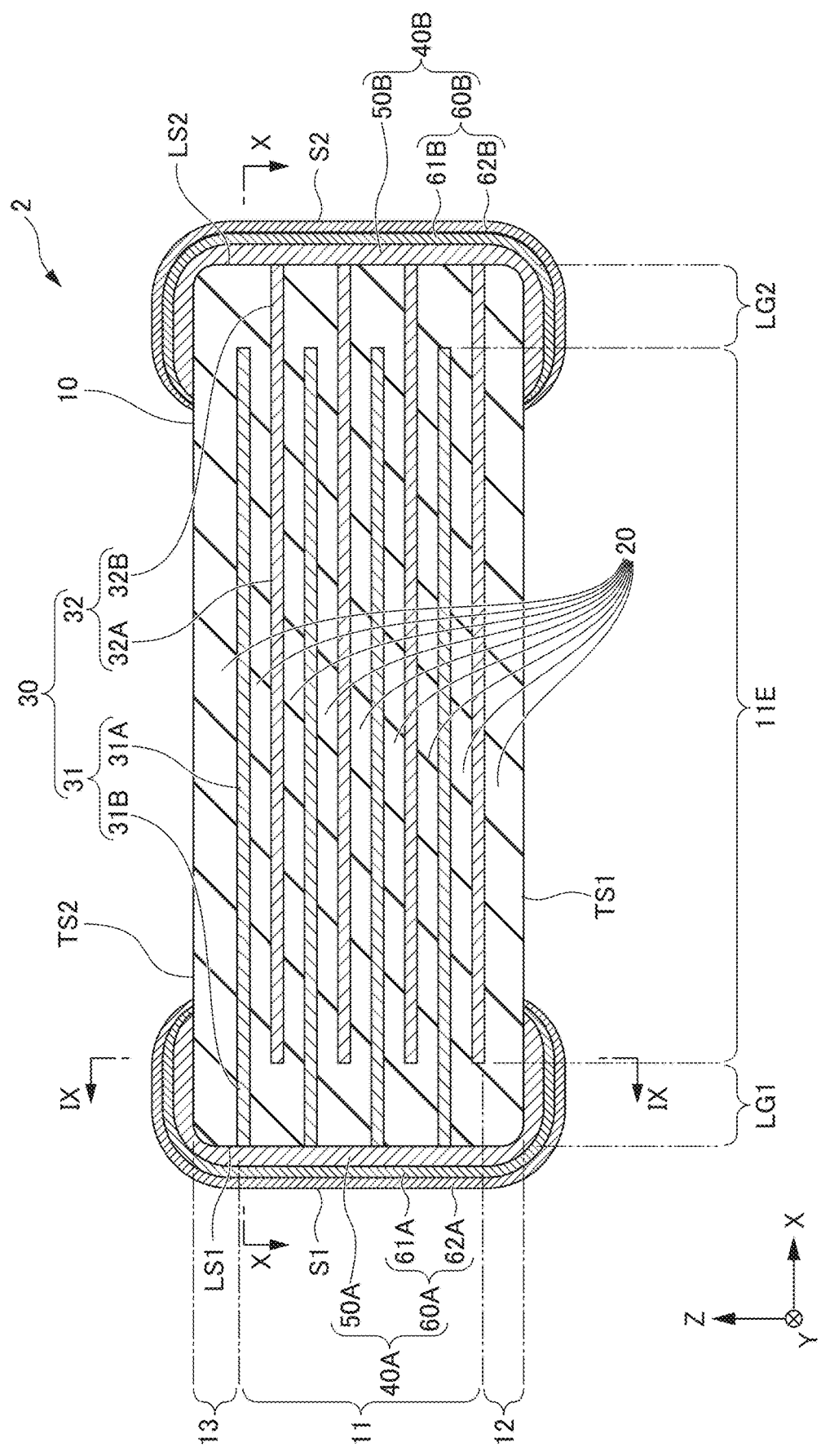
FIG. 8 is a cross-sectional view taken along the line VIII-VIII of the multilayer ceramic capacitor main body of FIG. 7.
Figure 9:
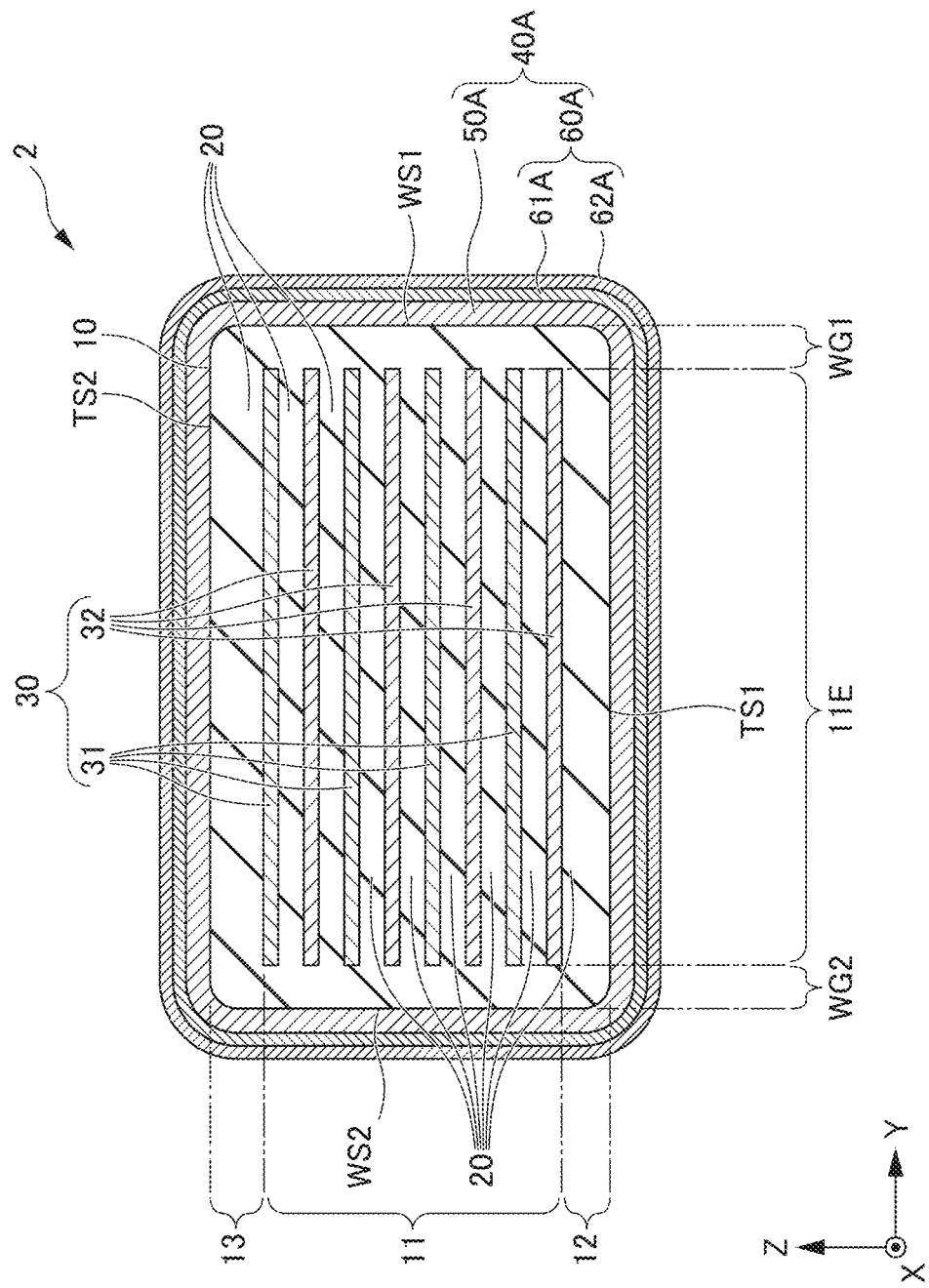
FIG. 9 is a cross-sectional view taken along the line IX-IX of the multilayer ceramic capacitor main body of FIG. 8.
Figure 10:
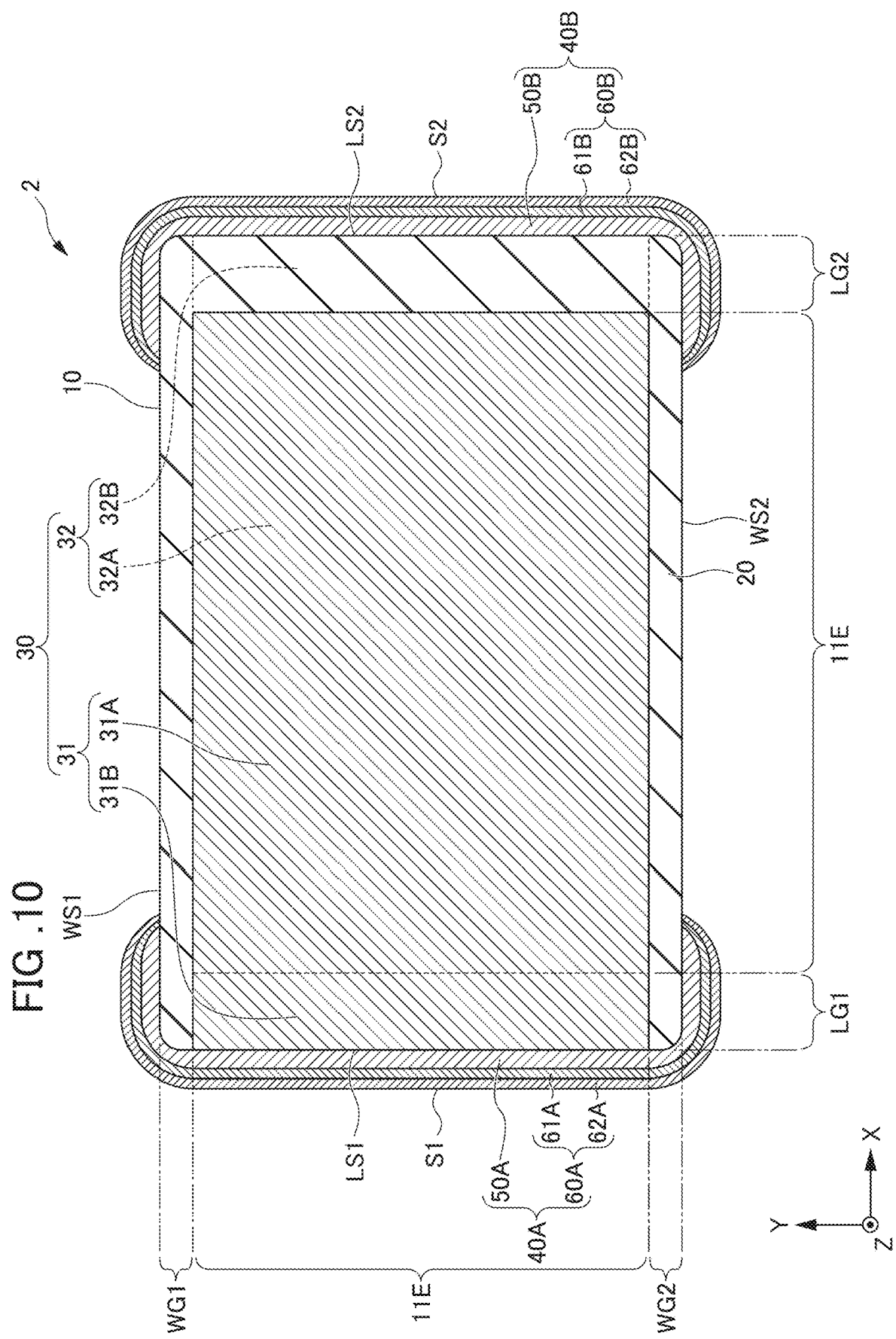
FIG. 10 is a cross-sectional view taken along the line X-X of the multilayer ceramic capacitor main body of FIG. 8.

The multilayer ceramic capacitor main body 2 will also be described with reference to FIGS. 7 to 10, in addition to FIGS. 5 to 6B. FIG. 7 is an external perspective view showing the appearance of the multilayer ceramic capacitor main body 2 before being covered with the exterior material 3 and before the metal terminal 100 is attached. FIG. 8 is a cross-sectional view taken along the line VIII-VIII of the multilayer ceramic capacitor main body 2 of FIG. 7. FIG. 9 is a cross-sectional view taken along the line IX-IX of the multilayer ceramic capacitor main body 2 of FIG. 8. FIG. 10 is a cross-sectional view taken along the line X-X of the multilayer ceramic capacitor main body 2 of FIG. 8.

The multilayer ceramic capacitor main body 2 includes a multilayer body 10 and external electrodes 40.

FIGS. 7 to 10 each show an XYZ Cartesian coordinate system. As shown in FIGS. 5 and 7, the length directions L of the multilayer ceramic capacitor main body 2 and the multilayer body 10 correspond to the X direction. The width directions W of the multilayer ceramic capacitor main body 2 and the multilayer body 10 correspond to the Y direction. The height directions T of the multilayer ceramic capacitor main body 2 and the multilayer body 10 correspond to the Z direction. Here, the cross section shown in FIG. 8 is also referred to as a cross section LT. The cross section shown in FIG. 9 is also referred to as a cross section WT. The cross section shown in FIG. 10 is also referred to as a cross section LW. A similar XYZ Cartesian coordinate system is also shown in FIGS. 1 to 6B, 11, and 13A to 18.

As shown in FIGS. 5 to 10, the multilayer body 10 includes a first main surface TS1 and a second main surface TS2 which oppose each other in the height direction T, a first lateral surface WS1 and a second lateral surface WS2 which oppose each other in the width direction W orthogonal or substantially orthogonal to the height direction T, and a first end surface LS1 and a second end surface LS2 which oppose each other in the length direction L orthogonal or substantially orthogonal to the height direction T and the width direction W.

The multilayer body 10 has a rectangular or substantially rectangular shape. The dimension of the multilayer body 10 in the length direction L is not necessarily longer than the dimension of the width direction W. The multilayer body 10 preferably includes rounded corner portions and rounded ridge portions. The corner portions are portions where the three surfaces of the multilayer body intersect, and the ridge portions are portions where the two surfaces of the multilayer body intersect. In addition, unevenness or the like may be provided on a portion of or an entirety or substantially an entirety of the surface of the multilayer body 10.

The dimension of the multilayer body 10 is not particularly limited. However, when the dimension in the length direction L of the multilayer body 10 is defined as L, L is preferably about 0.2 mm or more and about 10 mm or less, for example. When the dimension in the height direction T of the multilayer body 10 is defined as T, T is preferably about 0.1 mm or more and about 10 mm or less, for example. Furthermore, when the dimension in the width direction W of the multilayer body 10 is defined as W, W is preferably about 0.1 mm or more and about 10 mm or less, for example.

As shown in FIGS. 8 and 9, the multilayer body 10 includes an inner layer portion 11, and a first main surface-side outer layer portion 12 and a second main surface-side outer layer portion 13 sandwiching the inner layer portion 11 in the height direction T. The inner layer portion 11 may also be referred to as an active layer portion.

The inner layer portion 11 includes a plurality of dielectric layers 20 as a plurality of ceramic layers, and a plurality of internal electrode layers 30 as a plurality of inner conductive layers. The inner layer portion 11 extends, in the height direction T, from the internal electrode layer 30 located closest to the first main surface TS1 to the internal electrode layer 30 located closest to the second main surface TS2. In the inner layer portion 11, the plurality of internal electrode layers 30 are opposed to each other with the dielectric layers 20 interposed therebetween. The inner layer portion 11 is a portion that generates a capacitance, and thus substantially defines and functions as a capacitor.

The plurality of dielectric layers 20 are made of a dielectric material. For example, the dielectric material may be a dielectric ceramic including a component such as $BaTiO_3$, $CaTiO_3$, $SrTiO_3$, or $CaZrO_3$. Furthermore, the dielectric material may include a second component such as a Mn compound, an Fe compound, a Cr compound, a Co compound, or a Ni compound in addition to the main component.

The dielectric layers 20 each preferably have a thickness of, for example, about 0.5 μm or more and about 72 μm or less. The number of the dielectric layers 20 to be stacked (laminated) is preferably, for example, ten or more and 700 or less. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 (internal conductive layer 30) include a plurality of first internal electrode layers 31 (first internal conductive layer 31) and a plurality of second internal electrode layers 32 (second internal conductive layer 32). The plurality of first internal electrode layers 31 are provided on the plurality of dielectric layers 20. The plurality of second internal electrode layers 32 are provided on the plurality of dielectric layers 20. The plurality of first internal electrode layers 31 and the plurality of second internal electrode layers 32 are alternately provided in the height direction T of the multilayer body 10 with the dielectric layers 20 interposed therebetween. The first internal electrode layers 31 and the second internal electrode layers 32 sandwich the dielectric layers 20.

The first internal electrode layer 31 includes a first counter portion 31A that is opposed to the second internal electrode layer 32, and a first extension portion 31B extending from the first counter portion 31A toward the first end surface LS1. The first extension portion 31B is exposed at the first end surface LS1.

The second internal electrode layer 32 includes a second counter portion 32A that is opposed to the first internal electrode layer 31, and a second extension portion 32B extending from the second counter portion 32A toward the second end surface LS2. The second extension portion 32B is exposed at the second end surface LS2.

In a preferred embodiment of the present invention, the first counter portion 31A and the second counter portion 32A are opposed to each other with the dielectric layer 20 interposed therebetween, such that a capacitance is generated so as to provide the characteristics of a capacitor.

The shapes of the first counter portion 31A and the second counter portion 32A are not particularly limited. However, they are preferably rectangular or substantially rectangular, for example. However, the corners of the rectangular or substantially rectangular shape may be rounded or slanted. The shapes of the first extension portion 31B and the second extension portion 32B are not particularly limited. However, they are preferably rectangular or substantially rectangular, for example. However, the corners of the rectangular or substantially rectangular shape may be rounded or slanted.

The dimension in the width direction W of the first counter portion 31A and the dimension in the width direction W of the first extension portion 31B may be the same, or one of them may have a smaller dimension. The dimension in the width direction W of the second counter portion 32A and the dimension in the width direction W of the second extension portion 32B may be the same, or one of them may have a narrower dimension.

The first internal electrode layer 31 and the second internal electrode layer 32 are each made of a metal such as, for example, Ni, Cu, Ag, Pd, or Au, or a suitable conductive material such as an alloy including at least one of these metals. In a case in which an alloy is used, the first internal electrode layer 31 and the second internal electrode layer 32 may be made of, for example, a Ag—Pd alloy.

The thickness of each of the first internal electrode layer 31 and the second internal electrode layer 32 is preferably, for example, about 0.2 μm or more and about 3.0 μm or less. The total number of the first internal electrode layers 31 and the second internal electrode layers 32 is preferably, for example, five or more and 350 or less.

The first main surface-side outer layer portion 12 is located on the first main surface TS1 side of the multilayer body 10. The first main surface-side outer layer portion 12 includes a plurality of dielectric layers 20 as ceramic layers located between the first main surface TS1 and the internal electrode layer 30 closest to the first main surface TS1. In other words, the first main surface-side outer layer portion 12 includes a plurality of dielectric layers 20 located between the first main surface TS1 and the internal electrode layer 30 located closest to the first main surface TS1 side among the plurality of internal electrode layers 30. The dielectric layers 20 used in the first main surface-side outer layer portion 12 may be the same as the dielectric layers 20 used in the inner layer portion 11.

The second main surface-side outer layer portion 13 is located on the second main surface TS2 side of the multilayer body 10. The second main surface-side outer layer portion 13 includes a plurality of dielectric layers 20 located between the second main surface TS2 and the internal electrode layer 30 closest to the second main surface TS2. In other words, the second main surface-side outer layer portion 13 includes a plurality of dielectric layers 20 located between the second main surface TS2 and the internal electrode layer 30 located closest to the second main surface TS2 side among the plurality of internal electrode layers 30. The dielectric layers 20 used in the second main surface-side outer layer portion 13 may be the same as the dielectric layers 20 used in the inner layer portion 11.

As described above, the multilayer body 10 includes the plurality of dielectric layers 20 and the plurality of internal electrode layers 30 laminated on the dielectric layer 20. That is, the multilayer ceramic capacitor 1 includes the multilayer body 10 including the dielectric layers 20 and the internal electrode layers 30 alternately laminated therein.

The multilayer body 10 includes a counter electrode portion 11E. The counter electrode portion 11E refers to a portion where a first counter portion 31A of the first internal electrode layer 31 and a second counter portion 32A of the second internal electrode layer 32 are opposed to each other. The counter electrode portion 11E defines and functions as a portion of the inner layer portion 11. FIG. 8 shows the range of the counter electrode portion 11E in the length direction L. FIG. 9 shows the range of the counter electrode portion 11E in the width direction W. FIG. 10 shows the ranges of the width direction W and the length direction L of the counter electrode portion 11E. The counter electrode portion 11E is also referred to as a capacitor active portion.

The multilayer body 10 includes a lateral surface-side outer layer portion. The lateral surface-side outer layer portion includes a first lateral surface-side outer layer portion WG1 and a second lateral surface-side outer layer portion WG2. The first lateral surface-side outer layer portion WG1 includes the dielectric layers 20 located between the counter electrode portion 11E and the first lateral surface WS1. The second lateral surface-side outer layer portion WG2 includes the dielectric layers 20 located between the counter electrode portion 11E and the second lateral surface WS2. FIG. 9 and FIG. 10 each show the ranges in the width direction W of the first lateral surface-side outer layer portion WG1 and the second lateral surface-side outer layer portion WG2. The first lateral surface-side outer layer portion WG1 and the second lateral surface-side outer layer portion WG2 are also referred to as W gaps or side gaps.

The multilayer body 10 includes an end surface-side outer layer portion. The end surface-side outer layer portion includes a first end surface-side outer layer portion LG1 and a second end surface-side outer layer portion LG2. The first end surface-side outer layer portion LG1 includes the dielectric layers 20 located between the counter electrode portion 11E and the first end surface LS1, and the first extension portions 31B. The second end surface-side outer layer portion LG2 includes the dielectric layers 20 located between the counter electrode portion 11E and the second end surface LS2, and the second extension portion 32B. FIG. 8 and FIG. 10 each show the ranges in the length direction L of the first end surface-side outer layer portion LG1 and the second end surface-side outer layer portion LG2. The first end surface-side outer layer portion LG1 and the second end surface-side outer layer portion LG2 are also referred to as L gaps or end gaps.

The external electrode 40 includes a first external electrode 40A provided on the first end surface LS1 side and a second external electrode 40B provided on the second end surface LS2 side.

The first external electrode 40A is preferably provided at least on the first end surface LS1 and a portion on the first main surface TS1. In a preferred embodiment of the present invention, the first external electrode 40A is provided on the first end surface LS1, a portion of the first main surface TS1, a portion of the second main surface TS2, a portion of the first lateral surface WS1, and a portion of the second lateral surface WS2. Furthermore, in a preferred embodiment of the present invention, the first external electrode 40A is connected to the first internal electrode layers 31 on the first end surface LS1. Furthermore, for example, the first external electrode 40A may extend from the first end surface LS1 to a portion of the first main surface TS1. In other words, the cross-section of the first external electrode 40A may have an L shape (not shown). The portion provided on the first main surface TS1 of the first external electrode 40A is connected to a first metal terminal 100A described later via a first bonding material 5A described later.

The length L1 in the length direction L of the first external electrode 40A provided on the first main surface TS1 is preferably, for example, about 10% or more and about 40% or less (for example, about 20 μm or more and about 4000 μm or less) of the dimension L of the multilayer body 10. In a case in which the first external electrode 40A is provided on the second main surface TS2, the first lateral surface WS1, and the second lateral surface WS2, the length L1 in the length direction L of the first external electrode 40A provided on these surfaces is also preferably, for example, about 10% or more and about 40% or less (for example, about 20 μm or more and about 4000 μm or less) of the dimension L of the multilayer body 10.

The length W1 in the width direction W of the first external electrode 40A provided on the first main surface TS1 is preferably a dimension (for example, about 0.1 mm or more and about 10 mm or less) equal or substantially equal to the dimension W of the multilayer body 10. In a case in which the first external electrode 40A is also provided on the second main surface TS2, the length W1 in the width direction W of the first external electrode 40A provided on the second main surface TS2 is preferably a dimension substantially equal to the dimension W of the multilayer body 10 (for example, about 0.1 mm or more and about 10 mm or less). Furthermore, in a case in which the first external electrode 40A is provided on at least one surface of the first lateral surface WS1 or the second lateral surface WS2, the length T1 in the height direction T of the first external electrode 40A provided on this portion is preferably a dimension equal or substantially equal to the dimension T of the multilayer body 10 (for example, about 0.1 mm or more and about 10 mm or less).

The second external electrode 40B is preferably provided at least on the second end surface LS2 and a portion on the first main surface TS1. In a preferred embodiment of the present invention, the second external electrode 40B is provided on the second end surface LS2, a portion of the first main surface TS1, a portion of the second main surface TS2, a portion of the first lateral surface WS1, and a portion of the second lateral surface WS2. Furthermore, in a preferred embodiment of the present invention, the second external electrode 40B is connected to the second internal electrode layers 32 on the second end surface LS2. Furthermore, for example, the second external electrode 40B may extend from the second end surface LS2 to a portion of the first main surface TS1. In other words, the cross-section of the second external electrode 40B may have an L shape (not shown). The portion provided on the first main surface TS1 of the second external electrode 40B is connected to a second metal terminal 100B described later via a second bonding material 5B described later.

The length L2 in the length direction L of the second external electrode 40B provided on the first main surface TS1 is preferably, for example, about 10% or more and about 40% or less (for example, about 20 μm or more and about 4000 μm or less) of the dimension L of the multilayer body 10. In a case in which the second external electrode 40B is provided on the second main surface TS2, the first lateral surface WS1, and the second lateral surface WS2, the length L2 in the length direction L of the second external electrode 40B provided on these surfaces is also preferably, for example, about 10% or more and about 40% or less (for example, about 20 μm or more and about 4000 μm or less) of the dimension L of the multilayer body 10.

The length W1 in the width direction W of the second external electrode 40B provided on the first main surface TS1 is preferably a dimension (for example, about 0.1 mm or more and about 10 mm or less) substantially equal to the dimension W of the multilayer body 10. In a case in which the second external electrode 40B is also provided on the second main surface TS2, the length W1 in the width direction W of the second external electrode 40B provided on the second main surface TS2 is preferably a dimension substantially equal to the dimension W of the multilayer body 10 (for example, about 0.1 mm or more and about 10 mm or less). Furthermore, in a case in which the second external electrode 40B is provided on at least one surface of the first lateral surface WS1 or the second lateral surface WS2, the length T1 in the height direction T of the second external electrode 40B provided on this portion is preferably a dimension substantially equal to the dimension T of the multilayer body 10 (for example, about 0.1 mm or more and about 10 mm or less).

As shown in FIG. 7, in a preferred embodiment of the present invention, the length L3 in the length direction L of the portion of the surface of the multilayer body 10 exposed from the external electrode 40 is preferably, for example, about 20% or more and about 80% or less (for example, about 40 μm or more and about 8000 μm or less) of the dimension L of the multilayer body. In other words, the separation distance L3 between the first external electrode 40A and the second external electrode 40B is preferably, for example, about 20% or more and about 80% or less (for example, about 40 μm or more and about 8000 μm or less) of the dimension L of the multilayer body.

As described above, in the multilayer body 10, the capacitance is generated by the first counter portions 31A of the first internal electrode layers 31 and the second counter portions 32A of the second internal electrode layers 32 being opposed to each other with the dielectric layers 20 interposed therebetween. Therefore, the characteristics of the capacitor are developed between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layer 31. In a preferred embodiment of the present invention, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is connected to the second internal electrode layer 32. In a preferred embodiment of the present invention, the second base electrode layer 50B extends from the second end surface LS2 to a portion of the first main surface TS1 and to a portion of the second main surface TS2, and to a portion of the first lateral surface WS1 and to a portion of the second lateral surface WS2.

In a preferred embodiment of the present invention, the first base electrode layer 50A and the second base electrode layer 50B are each, for example, a fired layer. The fired layer preferably includes, for example, a metal component and either a glass component or a ceramic component, or alternatively, a metal component and both a glass component and a ceramic component. The metal component includes, for example, at least one selected from Cu, Ni, Ag, Pd, Ag—Pd alloys, and Au. The glass component includes, for example, at least one selected from B, Si, Ba, Mg, Al, and Li. As the ceramic component, a ceramic material of the same kind as that of the dielectric layer 20 may be used, or a ceramic material of a different kind may be used. The ceramic component includes, for example, at least one selected from $BaTiO_3$, $CaTiO_3$, $(Ba, Ca)TiO_3$, $SrTiO_3$, and $CaZrO_3$.

The fired layer is obtained by applying a conductive paste including glass and metal to the multilayer body, and then firing. The fired layer may be obtained by simultaneously firing a laminated (multilayer) chip including the internal electrode layers and the dielectric layers, and a conductive paste applied to the laminated chip, or alternatively may be obtained by firing the laminated chip including the internal electrode layers and the dielectric layers to thus obtain a multilayer body, followed by the conductive paste being applied to the multilayer body and then firing being performed. In a case in which the laminated chip including the internal electrode layers and the dielectric layers, and the conductive paste applied to the laminated chip are fired simultaneously, it is preferable that the firing layer is formed by firing a material to which a ceramic material is added instead of the glass component. In this case, it is particularly preferable to use the same type of ceramic material as the dielectric layer 20 as the ceramic material to be added. Furthermore, the fired layer may include a plurality of layers.

The thickness in the length direction of the first base electrode layer 50A located on the first end surface LS1 is preferably, for example, about 10 μm or more and about 200 μm or less at the middle portion in the height direction T and the width direction W of the first base electrode layer 50A.

The thickness in the length direction of the second base electrode layer 50B located on the second end surface LS2 is preferably, for example, about 10 μm or more and about 200 μm or less at the middle portion in the height direction T and the width direction W of the second base electrode layer 50B.

In a case in which the first base electrode layer 50A is provided on a portion of the surface of at least the first main surface TS1 or the second main surface TS2, it is preferable that the thickness in the height direction of the first base electrode layer 50A on the provided surface is, for example, about 5 μm or more and about 40 μm or less at the middle portion in the length direction L and the width direction W of the first base electrode layer 50A on the provided surface.

In a case in which the first base electrode layer 50A is provided on a portion of the surface of at least the first lateral surface WS1 or the second lateral surface WS2, it is preferable that the thickness in the width direction of the first base electrode layer 50A on the provided surface is, for example, about 5 μm or more and about 40 μm or less at the middle portion in the length direction L and the height direction T of the first base electrode layer 50A on the provided surface.

In a case in which the second base electrode layer 50B is provided on a portion of the surface of at least the first main surface TS1 or the second main surface TS2, it is preferable that the thickness in the height direction of the second base electrode layer 50B on the provided surface is, for example, about 5 μm or more and about 40 μm or less at the middle portion in the length direction L and the width direction W of the second base electrode layer 50B on the provided surface.

In a case in which the second base electrode layer 50B is provided on a portion of the surface of at least the first lateral surface WS1 or the second lateral surface WS2, it is preferable that the thickness in the width direction of the second base electrode layer 50B on the provided surface is, for example, about 5 μm or more and about 40 μm or less at the middle portion in the length direction L and the height direction T of the second base electrode layer 50B on the provided surface.

The first base electrode layer 50A and the second base electrode layer 50B are not limited to the fired layer, and each may be a thin film layer. The thin film layer is a layer in which metal particles are deposited, and which is formed by a thin film forming method such as a sputtering method or a deposition method. The thin film layer preferably includes, for example, at least one metal selected from the group consisting of Mg, Al, Ti, W, Cr, Cu, Ni, Ag, Co, Mo, and V. Thus, it is possible to increase the adhesion force of the external electrodes 40 to the multilayer body 10. The thin film layer may be a single layer or may include a plurality of layers. For example, the thin film layer may include a two-layer structure of a layer of NiCr and a layer of NiCu.

In a case in which the thin film layer as a base electrode is formed by a sputtering electrode by a sputtering method, the sputtering electrode is preferably formed on a portion of the first main surface TS1 and on a portion of the second main surface TS2 of the multilayer body 10. The sputtering electrode preferably includes at least one metal selected from Ni, Cr, and Cu, for example. The thickness of the sputtering electrode is preferably about 50 nm or more and about 400 nm or less, and more preferably about 50 nm or more and about 130 nm or less, for example.

As the base electrode layer, a sputtering electrode may be provided on a portion of the first main surface TS1 and on a portion of the second main surface TS2 of the multilayer body 10, while a fired layer may be provided on the first end surface LS1 and the second end surface LS2. Alternatively, the base electrode layer may not be provided on the first end surface LS1 and the second end surface LS2, and a plated layer, which will be described later, may be provided directly on the multilayer body 10. In addition, in a case in which a fired layer is provided on the first end surface LS1 and the second end surface LS2, the fired layer may be provided not only on the first end surface LS1 and the second end surface LS2, but also on a portion of the first main surface TS1 and on a portion of the second main surface TS2. In this case, the sputtering electrode may overlap the fired layer.

The first plated layer 60A covers the first base electrode layer 50A.

The second plated layer 60B covers the second base electrode layer 50B.

The first plated layer 60A and the second plated layer 60B may include at least one selected from Cu, Ni, Sn, Ag, Pd, Ag—Pd alloy, and Au, for example. Each of the first plated layer 60A and the second plated layer 60B may include a plurality of layers. The first plated layer 60A and the second plated layer 60B preferably have, for example, a two-layer structure in which a Sn-plated layer is provided on the Ni-plated layer.

The first plated layer 60A covers the first base electrode layer 50A. In a preferred embodiment of the present invention, the first plated layer 60A includes a first Ni-plated layer 61A and a first Sn-plated layer 62A located on the first Ni-plated layer 61A.

The second plated layer 60B covers the second base electrode layer 50B. In a preferred embodiment of the present invention, the second plated layer 60B includes a second Ni-plated layer 61B and a second Sn-plated layer 62B located on the second Ni-plated layer 61B.

The Ni-plated layer prevents the first base electrode layer 50A and the second base electrode layer 50B from being eroded by solder as the bonding material 5 (to be described later) for bonding the multilayer ceramic capacitor main body 2 and the metal terminal 100. Furthermore, the Sn-plated layer improves the wettability of the solder as the bonding material 5 (to be described later) for bonding the multilayer ceramic capacitor main body 2 and the metal terminal 100. This facilitates the bonding of the multilayer ceramic capacitor main body 2 and the metal terminal 100. In a case in which each of the first plated layer 60A and the second plated layer 60B is a two-layer structure of the Ni-plated layer and the Sn-plated layer, the thickness of each of the Ni-plated layer and the Sn-plated layer is preferably, for example, about 1 μm or more and about 15 μm or less.

Furthermore, the first external electrode 40A and the second external electrode 40B of a preferred embodiment of the present invention may each include a conductive resin layer including, for example, conductive particles and a thermosetting resin. In a case in which the conductive resin layer is provided as the base electrode layer (the first base electrode layer 50A, the second base electrode layer 50B), the conductive resin layer may cover the free layer or may be provided directly on the multilayer body 10 without providing the free layer. In a case in which the conductive resin layer covers the fired layer, the conductive resin layer is provided between the fired layer and the plated layer (the first plated layer 60A, the second plated layer 60B). The conductive resin layer may completely cover the fired layer or may partially cover the fired layer.

The conductive resin layer including a thermosetting resin is more flexible than a conductive layer made of, for example, a plating film or a fired product of a conductive paste. Therefore, even when an impact caused by physical shock or thermal cycle to the multilayer ceramic capacitor 1 is applied, the conductive resin layer defines and functions as a buffer layer. Accordingly, crack generation of the multilayer ceramic capacitor 1 is reduced or prevented.

The metal of the conductive particles may be, for example, Ag, Cu, Ni, Sn, Bi, or an alloy including them. The conductive particles preferably include Ag, for example. The conductive particles are metal powders of Ag, for example. Ag is suitable for electrode materials because of its lowest specific resistance among metals. Since Ag is a noble metal, it hardly oxidizes and the weatherability is high. Therefore, the metal powder of Ag is suitable as conductive particles.

Furthermore, the conductive particles may be, for example, a metal powder in which the surface of the metal powder is coated with Ag. In a case in which the metal powder coated with Ag is used, the metal powder is preferably, for example, Cu, Ni, Sn, Bi or an alloy powder thereof. In order to make the metal of the base material inexpensive while maintaining the Ag characteristics, it is preferable to use a metal powder coated with Ag.

Furthermore, the conductive particles may be formed by, for example, subjecting Cu or Ni to an oxidation prevention treatment. The conductive particles may be a metal powder obtained by coating the surface of the metal powder with, for example, Sn, Ni, or Cu. In a case in which the metal powder coated with Sn, Ni, or Cu is used, the metal powder is preferably, for example, Ag, Cu, Ni, Sn, or Bi or an alloy powder thereof.

The shape of the conductive particles is not particularly limited. The conductive particles may have a spherical shape, a flat shape, or the like. However, it is preferable to use a mixture of spherical and flat metal powders.

The conductive particles included in the conductive resin layer mainly secure the electric conductivity of the conductive resin layer. More specifically, the plurality of conductive particles are brought into contact with each other to form a current-carrying path inside the conductive resin layer.

The resin of the conductive resin layer may include, for example, at least one selected from various known thermosetting resins such as epoxy resin, phenol resin, urethane resin, silicone resin, and polyimide resin. Among them, epoxy resins excellent in heat resistance, moisture resistance, adhesiveness and the like are the most suitable resins. Furthermore, the resin of the conductive resin layer preferably includes a curing agent together with the thermosetting resin. In a case in which an epoxy resin is used as the base resin, the curing agent of the epoxy resin may be any of various known compounds such as, for example, phenolic, amine-based, acid anhydride-based, imidazole-based, active ester-based, and amideimide-based compounds.

In addition, the conductive resin layer may include a plurality of layers. The thickness of the thickest portion of the conductive resin layer is preferably, for example, about 10 μm or more and about 150 μm or less.

In addition, the first plated layer 60A and the second plated layer 60B (to be described later) may be directly provided on the multilayer body 10 without providing the first base electrode layer 50A and the second base electrode layer 50B. In other words, the multilayer ceramic capacitor 1 may include a plated layer that is electrically connected directly to the first internal electrode layers 31 and the second internal electrode layers 32. In such a case, a plated layer may be formed after placing a catalyst on the surface of the multilayer body 10 as a pretreatment.

Also in this case, the plated layer preferably includes a plurality of layers. Each of a lower plated layer and a lower plated layer preferably includes, for example, at least one metal selected from Cu, Ni, Sn, Pb, Au, Ag, Pd, Bi, Zn, and the like, or an alloy including these metals. The lower plated layer is more preferably made using, for example, Ni having solder barrier performance. The upper plated layer is more preferably made using, for example, Sn or Au having good solder wettability. Furthermore, in a case in which, for example, the first internal electrode layers 31 and the second internal electrode layers 32 are made using Ni, it is preferable that the lower plated layer is made using Cu having good bonding property with Ni. In addition, the upper plated layer may be provided as necessary, and the external electrode 40 may only include the lower plated layer. Furthermore, in the plated layer, the upper plated layer may be the outermost layer, or another plated layer may be further provided on the surface of the upper plated layer.

The thickness per layer of the plated layer without providing the base electrode layer is preferably, for example, about 2 μm or more and about 10 μm or less. The plated layer preferably does not include glass. The proportion of metal per unit volume of the plated layer is preferably, for example, about 99% by volume or more.

In a case in which the plated layer is provided directly on the multilayer body 10, it is possible to reduce the thickness of the base electrode layer. Therefore, it is possible to reduce the dimension in the height direction T of the multilayer ceramic capacitor main body 2 by the amount of the reduction in thickness of the base electrode layer, thus reducing the height of the multilayer ceramic capacitor main body 2. Alternatively, it is possible to increase the thickness of the dielectric layers 20 sandwiched between the first internal electrode layers 31 and the second internal electrode layers 32 by the amount of the reduction in thickness of the base electrode layer, thus improving the thickness of the base body. In this way, by providing the plated layer directly on the multilayer body 10, it is possible to improve the degree of freedom in designing the multilayer ceramic capacitor.

When the dimension in the length direction of the multilayer ceramic capacitor main body 2 including the multilayer body 10 and the external electrode 40 is defined as the dimension L, L is preferably, for example, about 0.2 mm or more and about 10 mm or less. When the dimension in the height direction of the multilayer ceramic capacitor main body 2 is defined as the dimension T, T is preferably, for example, about 0.1 mm or more and about 10 mm or less. When the dimension in the width direction of the multilayer ceramic capacitor main body 2 is defined as the dimension W, W is preferably, for example, about 0.1 mm or more and about 10 mm or less.

In a preferred embodiment of the present invention, the first surface S1 on the first end surface LS1 side of the multilayer ceramic capacitor main body 2 is defined by the surface of the first external electrode 40A provided on the first end surface LS1. The second surface S2 on the second end surface LS2 side of the multilayer ceramic capacitor main body 2 is defined by the surface of the second external electrode 40B provided on the second end surface LS2.

Figure 12A:
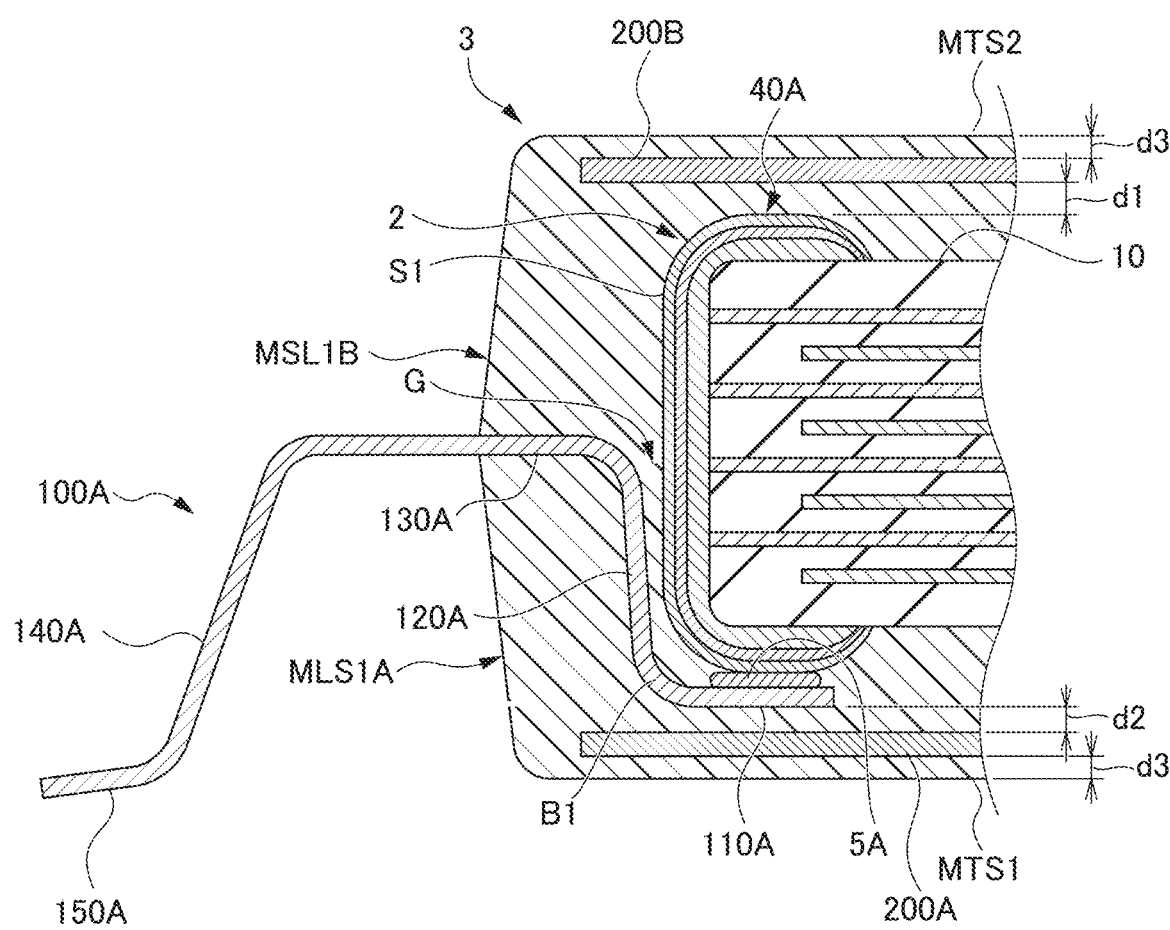
FIG. 12A is an enlarged view of a portion XIIA of the multilayer ceramic capacitor shown in FIGS. 6A and 6B.
Figure 12B:
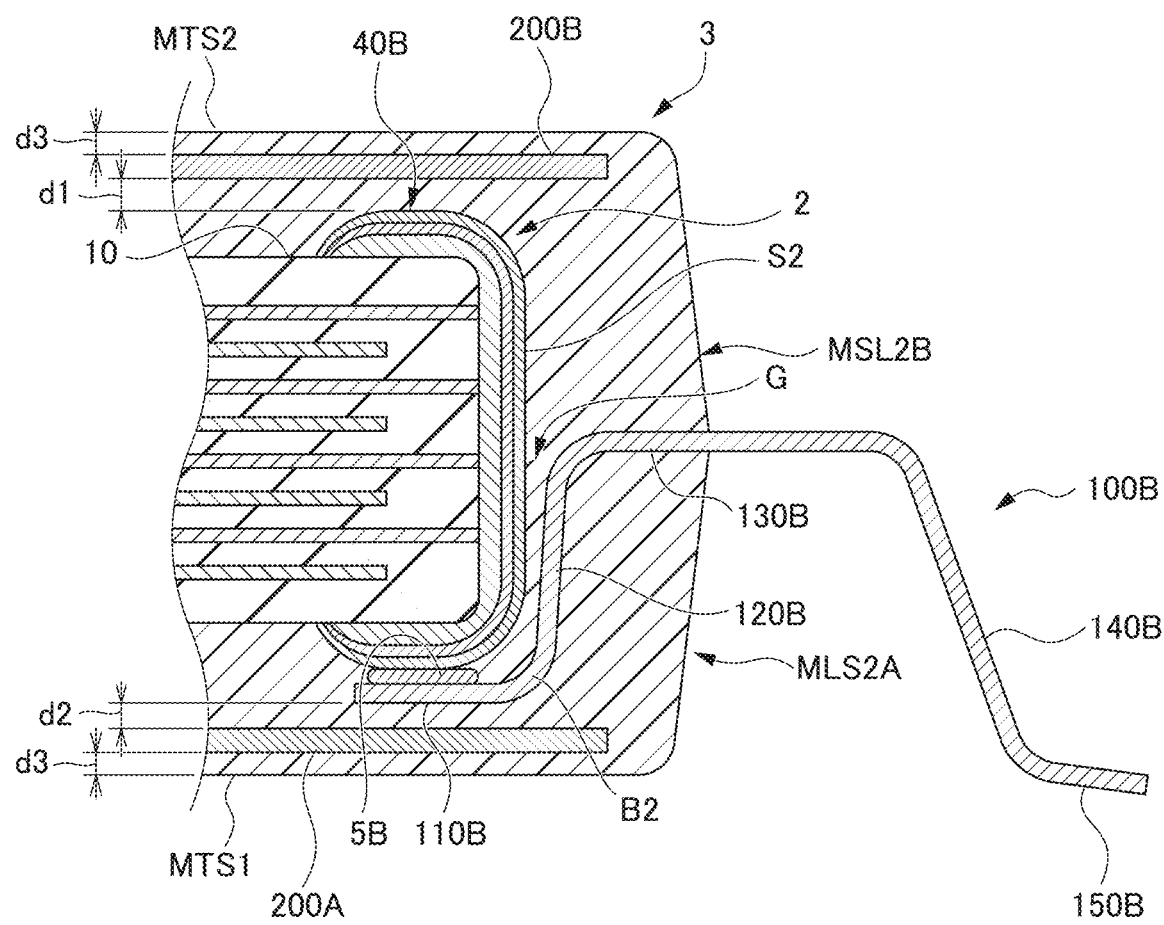
FIG. 12B is an enlarged view of a portion XIIB of the multilayer ceramic capacitor shown in FIG. 6.

The metal terminal 100 will be described with reference to FIGS. 11 to 12B in addition to FIGS. 1 to 6A. FIG. 11 is a view corresponding to FIG. 4, and is an arrow view as seen in the height direction from the second main surface TS2 toward the first main surface TS1, showing the metal terminal 100 when the exterior material 3 and the multilayer ceramic capacitor main body 2 are excluded. In FIG. 11, the profile of the multilayer body 10 and the external electrode 40 of the multilayer ceramic capacitor main body 2 are indicated by a two-dot chain line. FIG. 12A is an enlarged view of a portion XIIA of the multilayer ceramic capacitor 1 shown in FIG. 6A. FIG. 12B is an enlarged view of a portion XIIB of the multilayer ceramic capacitor 1 shown in FIGS. 6A and 6B.

The metal terminal 100 includes a first metal terminal 100A and a second metal terminal 100B.

The first metal terminal 100A and the second metal terminal 100B are metal terminals to be mounted on a mounting surface of a mounting board (refer to the mounting board 310 in FIG. 17) to be described later on which the multilayer ceramic capacitor 1 is to be mounted. The first metal terminal 100A and the second metal terminal 100B are, for example, plate-shaped lead frames. In a preferred embodiment of the present invention, the first main surface TS1 of the multilayer body 10 is a surface opposed to the mounting surface of the mounting board to which the multilayer ceramic capacitor 1 is to be mounted.

The first metal terminal 100A includes a first bonding portion 110A that is opposed to the first main surface TS1 and connected to the first external electrode 40A, a first rising portion 120A that is connected to the first bonding portion 110A, extends away from the mounting surface of the mounting board, and is opposed to the first end surface LS1, a first extension portion 130A that is connected to the first rising portion 120A and extends away from the multilayer ceramic capacitor main body 2 in the length direction L, a first falling portion 140A that is connected to the first extension portion 130A and extends toward the mounting surface side of the mounting board, and a first mounting portion 150A that is connected to the first falling portion 140A and extends in the direction along the mounting surface of the mounting board. As shown in FIGS. 6A and 12A, a gap portion G exists between the first rising portion 120A and the first surface S1 on the first end surface LS1 side of the multilayer ceramic capacitor main body 2.

The second metal terminal 100B includes a second bonding portion 110B that is opposed to the first main surface TS1 and connected to the second external electrode 40B, a second rising portion 120B that is connected to the second bonding portion 110B, extends away from the mounting surface of the mounting board, and is opposed to the second end surface LS2, a second extension portion 130B that is connected to the second rising portion 120B an extends away from the multilayer ceramic capacitor main body 2 in the length direction L, a second falling portion 140B that is connected to the second extension portion 130B and extends toward the mounting surface side of the mounting board, and a second mounting portion 150B that is connected to the second falling portion 140B and extends in the direction along the mounting surface of the mounting board. As shown in FIGS. 6A and 12B, a gap portion G exists between the second rising portion 120B and the second surface S2 on the second end surface LS2 side of the multilayer ceramic capacitor main body 2.

In addition, the first falling portion 140A and the second falling portion 140B preferably extend toward the mounting surface of the mounting board to an extent such that a gap can be provided between the exterior material 3 of the multilayer ceramic capacitor 1 and the mounting surface of the mounting board.

By providing such a first metal terminal 100A and a second metal terminal 100B, it is possible to lengthen the distance between the mounting board and the multilayer ceramic capacitor main body 2 such that it is possible to achieve an advantageous effect of relieving stress from the mounting board. Furthermore, the thickness of the exterior material 3 provided on the mounting border side can be increased such that the insulating property can be ensured.

As shown in FIGS. 6A and 11, the separation distance L4 between the first mounting portion 150A of the first metal terminal 100A and the second mounting portion 150B of the second metal terminal 100B is longer than the separation distance L3 between the first external electrode 40A and the second external electrode 40B of the multilayer ceramic capacitor main body 2.

The bonding material 5 joins the multilayer ceramic capacitor main body 2 and the metal terminal 100. The bonding material 5 includes a first bonding material 5A and a second bonding material 5B.

As shown in FIG. 6A, the first metal terminal 100A is connected to the first external electrode 40A through the first bonding material 5A. The second metal terminal 100B is connected to the second external electrode 40B via the second bonding material 5B.

The bonding material 5 is preferably solder. For example, Pb-free solder may be used. As the Pb-free solder, for example, lead-free solder such as Sn—Sb solder, Sn—Ag—Cu solder, Sn—Cu solder, and Sn—Bi solder is preferable. For example, Sn-10Sb to Sn-15Sb solder can be used.

Referring to FIGS. 5 to 6B, 12A and 12B, an electrostatic shielding metal 200 as a metal shield will be described.

The electrostatic shielding metal 200 is embedded in the exterior material 3. The electrostatic shielding metal 200 is provided between the surface of the exterior material 3 and the surface of the multilayer ceramic capacitor main body 2, and is provided at a position spaced away from the multilayer ceramic capacitor main body 2.

The electrostatic shielding metal 200 covers at least a portion of the multilayer ceramic capacitor main body 2. The electrostatic shielding metal 200 preferably covers at least a portion of a surface opposed to the mounting surface of the mounting board to which the multilayer ceramic electronic component is to be mounted among the first main surface TS1, the second main surface TS2, the first lateral surface WS1, and the second lateral surface WS2 of the multilayer ceramic capacitor main body 2. In a preferred embodiment of the present invention, the electrostatic shielding metal 200 covers at least a portion of the first main surface TS1. Furthermore, the dimension in the width direction W of the electrostatic shielding metal 200 is preferably longer than the dimension in the width direction W of the portion exposed from the external electrode on the surface of the multilayer body 10.

The electrostatic shielding metal 200 is preferably a tubular member. The electrostatic shielding metal 200 of a preferred embodiment of the present invention covers at least a portion of the first main surface TS1, at least a portion of the second main surface TS2, at least a portion of the first lateral surface WS1, and at least a portion of the second lateral surface WS2 of the multilayer body 10. In other words, the electrostatic shielding metal 200 of a preferred embodiment of the present invention includes a first shielding portion 200A that covers at least a portion of the first main surface TS1, a second shielding portion 200B that covers at least a portion of the second main surface TS2, a third shielding portion 200C that covers at least a portion of the first lateral surface WS1, and a fourth shielding portion 200D that covers at least a portion of the second lateral surface WS2. In addition, the electrostatic shielding metal 200 is preferably a tubular member having a cross-sectional shape corresponding to the shape of the cross section WT of the multilayer body 10 of the multilayer ceramic capacitor main body 2, for example, a rectangular or substantially rectangular cross-sectional shape. However, the electrostatic shielding metal 200 may be, for example, a tubular member having a circular or substantially circular cross section or a tubular member having a polygonal or substantially polygonal cross section.

The electrostatic shielding metal 200 preferably covers a portion of the surface of the multilayer body 10 exposed from the external electrode 40. The dimension L5 in the length direction L of the electrostatic shielding metal 200 is preferably longer than the dimension L3 in the length direction L of a portion of the surface of the multilayer body 10 exposed from the external electrode 40. More preferably, the dimension L5 in the length direction L of the electrostatic shielding metal 200 is longer than the dimension L0 in the length direction L of the multilayer ceramic electronic component. More preferably, the dimension L5 in the length direction L of the electrostatic shielding metal 200 is longer than the distance in the length direction between the position of a first notch 160A of the first metal terminal 100A on the first end surface LS1 side and the position of a second notch 160B of the second metal terminal 100B on the second end surface LS2 side. Alternatively, the dimension L5 in the length direction L of the electrostatic shielding metal 200 is more preferably longer than the distance L6 in the length direction between a bent portion B1 constituting a connecting portion of the first bonding portion 110A and the first rising portion 120A and a bent portion B2 constituting a connecting portion of the second bonding portion 110B and the second rising portion 120B.

As a member defining the electrostatic shielding metal 200, for example, a metal plate, a wire mesh, a metal thin film, or the like is used. In a preferred embodiment of the present invention, a metal plate is used as a member defining the electrostatic shielding metal 200.

In a preferred embodiment of the present invention, the electrostatic shielding metal 200 is a tubular member of a metal plate. In a preferred embodiment of the present invention, the electrostatic shielding metal 200 includes a first metal plate 210 and a second metal plate 220, which will be described later in detail in the description of the manufacturing method. As shown in FIG. 6B, the first metal plate 210 includes a metal plate having a U-shaped cross section. The first metal plate 210 includes two bent portions, and covers three surfaces among the first main surface TS1, the second main surface TS2, the first lateral surface WS1, and the second lateral surface WS2 of the multilayer body 10. In a preferred embodiment of the present invention, the first metal plate 210 covers three surfaces of the second main surface TS2, the first lateral surface WS1, and the second lateral surface WS2 of the multilayer body 10. The second metal plate 220 includes a plate-shaped metal plate. The second metal plate 220 covers the surface that is not covered by the first metal plate 210. This surface is one selected from the first main surface TS1, the second main surface TS2, the first lateral surface WS1, and the second lateral surface WS2 of the multilayer body 10. In a preferred embodiment of the present invention, the second metal plate 220 covers the first main surface TS1 of the multilayer body 10.

In addition, the tubular electrostatic shielding metal 200 may include a slit or a bonding portion provided along the length direction L. That is, the portion S where the first metal plate 210 and the second metal plate 220 are close to each other may be bonded, or may remain as a slit without being bonded to each other. In particular, in a configuration in which the bent metal terminal 100 is used, it is easier to manufacture a tubular member having a slit or a bonding portion than a seamless tubular member having neither a slit nor a bonding portion as the electrostatic shielding metal 200. However, a seamless tubular member may be used.

In addition, the opening area of the opening on the first end surface LS1 side of the tubular electrostatic shielding metal 200 may be larger than the area of the first surface S1 on the first end surface LS1 side of the multilayer ceramic capacitor main body 2. The opening area of the opening on the second end surface LS2 side of the tubular electrostatic shielding metal 200 may be larger than the area of the second surface S2 on the second end surface LS2 side of the multilayer ceramic capacitor main body 2. This makes it difficult for the electrostatic shielding metal 200 to come into contact with the external electrode 40 of the multilayer ceramic capacitor main body 2 or the metal terminal 100. Furthermore, the manufacturing becomes easy.

As described above, it is preferable that the electrostatic shielding metal 200 includes the two bent portions and includes the member that covers three surfaces among the first main surface TS1, the second main surface TS2, the first lateral surface WS1, and the second lateral surface WS2 of the multilayer body 10 of the multilayer ceramic capacitor main body 2. This facilitates the manufacturing.

The specific configuration of the electrostatic shielding metal 200 is not limited thereto. For example, the tubular electrostatic shielding metal 200 may include two metal plates each having an L-shaped cross section. Considering the manufacturing process, it is preferable that the tubular electrostatic shielding metal 200 includes two metal plates or a plurality of metal plates. However, a single metal plate may be wound to form such a tubular electrostatic shielding metal 200. As the tubular electrostatic shielding metal 200, a tubular member including neither a slit nor a bonding portion may be used.

The metal plate defining the electrostatic shielding metal 200 is preferably a metal plate including at least one of Ni or Al, for example. The thickness of the metal plate defining the electrostatic shielding metal 200 is preferably, for example, about 0.05 mm or more and about 0.2 mm or less. A wire mesh may be wound to form such a tubular electrostatic shielding metal 200.

An insulating layer (refer to insulating layers 510 and 520 in FIGS. 14A to 16B) may be provided between the first metal plate 210 and the multilayer ceramic capacitor main body 2 and between the second metal plate 220 and the multilayer ceramic capacitor main body 2, which will be described later in detail in the description of the manufacturing method. Thus, relative positioning between the multilayer ceramic capacitor main body 2 and the electrostatic shielding metal 200 is facilitated, and the subsequent molding process of the exterior material 3 and the like is facilitated. The insulating layer may be bonded with the multilayer ceramic capacitor main body 2 by an adhesive. The insulating layer may be bonded with the first metal plate 210 by an adhesive. The insulating layer may be bonded with the second metal plate 220 by an adhesive. The insulating layer and the adhesive may be made of the same kind of material as the exterior material 3. The insulating layer may be, for example, a thermosetting epoxy resin. The adhesive may be, for example, an epoxy adhesive. In a preferred embodiment of the present invention, the insulating layer and the adhesive are made of the same material as the exterior material 3. Therefore, in FIGS. 6A, 6B, 12A, and 12B, the insulating layer and the adhesive are not distinguished from the exterior material 3. However, the insulating layer and the adhesive may be made of different materials from the exterior material 3. The insulating layer provides insulation between the multilayer ceramic capacitor main body 2 and the electrostatic shielding metal 200 in the same or substantially the same manner as in the case of the exterior material 3 after completion of the multilayer ceramic capacitor 1.

The exterior material 3 will be described with reference to FIGS. 1 to 6B, 12A and 12B.

The exterior material 3 includes a first main surface MTS1 and a second main surface MTS2 which are opposed to each other in the height direction T, a first lateral surface MWS1 and a second lateral surface MWS2 which are opposed to each other in the width direction W orthogonal or substantially orthogonal to the height direction T, and a first end surface MLS1 and a second end surface MLS2 which are opposed to each other in the length direction L orthogonal or substantially orthogonal to the height direction T and the width direction W. The first end surface MLS1 of the exterior material 3 is a surface of the exterior material 3 and is located on the first end surface LS1 side of the multilayer body 10. The second end surface MLS2 of the exterior material 3 is a surface of the exterior material 3 and is located on the second end surface LS2 side of the multilayer body 10.

The first lateral surface MWS1, the second lateral surface MWS2, the first end surface MLS1, and the second end surface MLS2 of the exterior material 3 have a parting line PL near the middle portion in the height direction T. The parting line PL is a line corresponding to a split surface of a mold used for molding the exterior material 3. The surface of the exterior material 3 is provided with a draft angle with the parting line PL defining a boundary.

The first lateral surface MWS1 of the exterior material 3 includes a first main surface-side surface MWS1A and a second main surface-side surface MWS1B. The second lateral surface MWS2 of the exterior material 3 includes a first main surface-side surface MWS2A and a second main surface-side surface MWS2B. The first end surface MLS1 of the exterior material 3 includes a first main surface-side surface MLS1A and a second main surface-side surface MLS1B. The second end surface MLS2 of the exterior material 3 includes a first main surface-side surface MLS2A and a second main surface-side surface MLS2B. The surface on the first main surface side and the surface on the second main surface side are separated from each other with the parting line PL as a boundary.

Each of the surfaces MWS1A, MWS2A, MLS1A and MLS2A on the first main surface side is provided with a draft angle such that the cross-sectional area of the cross section LW of the exterior material 3 becomes smaller approaching the first main surface TS1 from the parting line PL. Each of the surfaces MWS1B, MWS2B, MLS1B, and MLS2B on the second main surface side is provided with a draft angle such that the cross-sectional area of the cross section LW of the exterior material 3 becomes smaller approaching the second main surface TS2 from the parting line PL.

The exterior material 3 covers the multilayer ceramic capacitor main body 2, the electrostatic shielding metal 200, the bonding material 5 connecting the multilayer ceramic capacitor main body 2 and the metal terminal 100 with each other, and a portion of the metal terminal 100. More specifically, the exterior material 3 covers the entire or substantially the entire multilayer ceramic capacitor main body 2, the entire first bonding material 5A and second bonding material 5B, a portion of the first metal terminal 100A, and a portion of the second metal terminal 100B.

For example, the exterior material 3 covers the entire or substantially the entire first bonding portion 110A, the entire or substantially the entire first rising portion 120A, and at least a portion of the first extension portion 130A of the first metal terminal 100A. Furthermore, the exterior material 3 covers the entire or substantially the entire second bonding portion 110B, the entire second rising portion 120B, and at least a portion of the second extension portion 130B of the second metal terminal 100B.

In a preferred embodiment of the present invention, the first extension portion 130A of the first metal terminal 100A protrudes from the first end surface MLS1 of the exterior material 3 and is partially exposed. The second extension portion 130B of the second metal terminal 100B protrudes from the second end surface MLS2 of the exterior material 3 and is partially exposed. More specifically, the first extension portion 130A of the first metal terminal 100A protrudes from the parting line PL of the first end surface MLS1 of the exterior material 3 and is partially exposed. The second extension portion 130B of the second metal terminal 100B protrudes from the parting line PL of the second end surface MLS2 of the exterior material 3 and is partially exposed.

The second main surface MTS2 of the exterior material 3 preferably has a planar shape with a predetermined flatness. With such a configuration, it is possible to prevent improper suction adhesion of the mounter of the mounting machine used when mounting the multilayer ceramic capacitor 1 on the mounting board. Therefore, it is possible to reliably mount the multilayer ceramic capacitor 1 on the mounting board. As a result, it is possible to reduce or prevent the occurrence of mounting defects.

The minimum distance from the second main surface MTS2 of the exterior material 3 to the surface of the multilayer ceramic capacitor main body 2 is preferably. For example, about 450 μm or more and about 750 μm or less. The minimum distance from the first main surface MTS1 of the exterior material 3 to the first bonding portion 110A of the first metal terminal 100A is preferably, for example, about 450 μm or more and about 750 μm or less. The minimum distance from the first main surface MTS1 of the exterior material 3 to the second bonding portion 110B of the second metal terminal 100B is preferably, for example, about 450 μm or more and about 750 μm or less. The minimum distance from the first lateral surface MWS1 of the exterior material 3 to the surface of the multilayer ceramic capacitor main body 2 is preferably, for example, about 200 μm or more and about 500 μm or less. The minimum distance from the second lateral surface MWS2 of the exterior material 3 to the surface of the multilayer ceramic capacitor main body 2 is preferably, for example, about 200 μm or more and about 500 μm or less. The minimum distance from the first end surface MLS1 of the exterior material 3 to the surface of the multilayer ceramic capacitor main body 2 is preferably, for example, about 300 μm or more and about 700 μm or less. The minimum distance from the second end surface MLS2 of the exterior material 3 to the surface of the multilayer ceramic capacitor main body 2 is preferably, for example, about 300 μm or more and about 700 μm or less. The average distance in the length direction L from the first main surface-side surface MLS1A of the first end surface MLS1 of the exterior material 3 to the first rising portion 120A of the first metal terminal 100A is preferably, for example, about 200 μm or more and about 650 μm or less. The average distance in the length direction L from the first main surface-side surface MLS2A of the second end surface MLS2 of the exterior material 3 to the second rising portion 120B of the second metal terminal 100B is preferably, for example, about 200 μm or more and about 650 μm or less.

The minimum distance d1 from the surface of the multilayer ceramic capacitor main body 2 to the electrostatic shielding metal 200 is preferably, for example, about 400 μm or more and 600 μm or less. The minimum distance d2 from the first bonding portion 110A to the electrostatic shielding metal 200 of the first metal terminal 100A is preferably, for example, about 400 μm or more and about 600 μm or less. The minimum distance d2 from the second bonding portion 110B of the second metal terminal 100B to the electrostatic shielding metal is preferably, for example, about 400 μm or more and about 600 μm or less. The minimum distance d3 from the surface of the exterior material 3 to the electrostatic shielding metal 200 is preferably, for example, about 50 μm or more and about 150 μm or less.

The space between the multilayer ceramic capacitor main body 2 and the electrostatic shielding metal 200 is filled with the exterior material 3. The space between the metal terminal 100 and the electrostatic shielding metal 200 is filled with the exterior material 3. This makes it possible to secure insulation between the multilayer ceramic capacitor main body 2 and the electrostatic shielding metal 200, while preventing the multilayer ceramic capacitor 1 from increasing in size. Furthermore, since the electrostatic shielding metal 200 is embedded in the exterior material 3, it is possible to lower the possibility of the occurrence of creeping discharge caused by exposure of electrostatic shielding metal 200.

The exterior material 3 is preferably made of, for example, a resin. For example, the exterior material 3 may be formed by molding engineering plastic by transfer molding, injection molding, or the like. In particular, the material of the exterior material 3 preferably includes a thermosetting epoxy resin. With such a configuration, adhesion between the exterior material 3, and the multilayer ceramic capacitor main body 2 and the metal terminal 100 can be ensured, such that it is possible to achieve the advantageous effect of improving the withstand voltage and moisture resistance. The exterior material 3 may be formed, for example, by applying a liquid or powdery silicone-based or epoxy-based resin.

In this way, by the exterior material 3 covering the conductive metal portion such as the external electrode 40 and the metal terminal 100 over a wide range, it is possible to ensure the insulating surface distance (creeping distance) between the conductors. Furthermore, by covering the conductive metal portion over a wide range with the exterior material 3, it is possible to avoid the risk of surface discharge.

The shape of the exterior material 3 is not particularly limited. For example, a truncated cone such as a truncated pyramid may be used. The shape of the corner portion of the exterior material 3 is not particularly limited, and may be rounded.

Figure 12C:
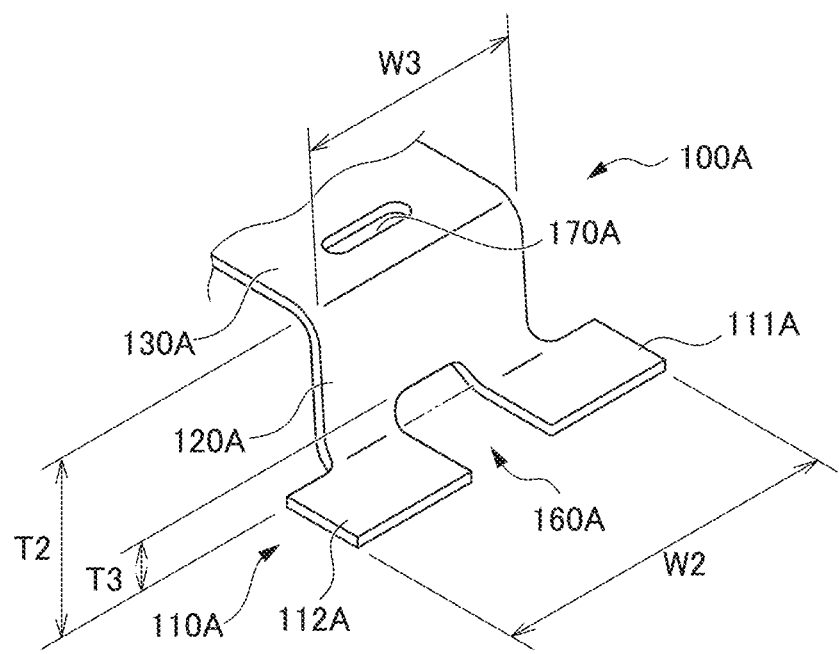
FIG. 12C is a partial external perspective view of a first metal terminal.

In addition to FIG. 5, FIG. 6A, and FIGS. 11 to 12B, with reference to FIG. 12C, a description will be provided of a configuration around the bonding portion between the metal terminal 100 and the external electrode 40 of the multilayer ceramic capacitor main body 2, and details of the metal terminal 100. FIG. 12C is a partial external perspective view of the first metal terminal 100A.

FIG. 12C shows a portion of the appearance of the first metal terminal 100A as an example of the metal terminal 100. The first metal terminal 100A and the second metal terminal 100B are generally plane-symmetrical with respect to the cross section WT at the middle in the length direction L of the multilayer ceramic capacitor 1. Therefore, the external perspective view (not shown) of the second metal terminal 100B is the same or substantially the same as the external perspective view of the first metal terminal 100A.

The first metal terminal 100A includes a first notch 160A, a first opening portion 170A, and a third notch 180A.

The first notch 160A continuously extends from the end of the first bonding portion 110A to a position in the middle of the first rising portion 120A. With such a configuration, for example, when the exterior material 3 is molded, the resin defining the exterior material 3 flows through the first notch 160A, such that the gap portion G is easily filled with the resin. Furthermore, since the resin defining the exterior material 3 is provided in the first notch 160A, the resin on one surface side and the resin on the other surface side of the first rising portion 120A of the first metal terminal 100A are connected by the resin in the first notch 160A, such that the structure becomes stronger. Since the cut-away portion of the first notch 160A extends to a position in the middle or approximate middle of the first rising portion 120A, the strength of the first metal terminal 100A is ensured. Since the first rising portion 120A of a preferred embodiment of the present invention is sloped, for example, during molding of the exterior material 3, the resin defining the exterior material 3 is likely to enter the gap portion G and flow through the first notch 160A.

As shown in FIG. 12C, the rising height T3 of the first notch 160A in the height direction T is preferably about half or less the rising height T2 of the first rising portion 120A in the height direction T. With such a configuration, for example, when the exterior material 3 is molded, it is possible to ensure the strength of the first metal terminal 100A, while ensuring the flowability of the resin defining the exterior material 3.

The first bonding portion 110A includes a first bonding piece 111A on the first lateral surface WS1 side and a second bonding piece 112A on the second lateral surface WS2 side which are divided by the first notch 160A.

The first opening portion 170A is provided at the first extension portion 130A. As described above, by providing the first opening portion 170A in addition to the first notch 160A in the first metal terminal 100A, it is possible to further improve the flowability of the resin defining the exterior material 3 during molding of the exterior material 3, for example. Furthermore, since the resin defining the exterior material 3 is provided in the first opening portion 170A, the resin on one surface side and the resin on the other surface side of the first extension portion 130A of the first metal terminal 100A are connected by the resin provided in the first opening portion 170A, such that the structure becomes stronger. According to the above configuration, it is preferable that the same material defining the exterior material 3 is provided in the portion of the first notch 160A provided in the first rising portion 120A and the first opening portion 170A. With such a configuration, the structure of the multilayer ceramic capacitor 1 becomes strong.

The third notch 180A continuously extends from the end of the first mounting portion 150A to a position in the middle of the first falling portion 140A.

As shown in FIGS. 11 and 12C, the length W2 in the width direction of the first bonding portion 110A of the first metal terminal 100A is longer than the length W3 in the width direction of the first rising portion 120A. With such a configuration, it is possible to ensure a wide bonding area between the first external electrode 40A and the first metal terminal 100A by the first bonding material 5A. In particular, even when the first notch 160A is provided as described above, it is still possible to ensure a wide bonding area between the first external electrode 40A and the first metal terminal 100A by the first bonding material 5A.

The length W4 in the width direction W of the first notch 160A may be equal to or substantially equal to the length W5 in the width direction W of the first opening portion 170A. The rising height T3 of the first notch 160A in the height direction T may be the same or approximately the same as the length L6 in the length direction L of the first opening portion 170A. For example, the area of the first notch 160A in the first rising portion 120A may fall within a range from, for example, about 50% to about 200% of the area of the first opening portion 170A. With such a configuration, for example, when the exterior material 3 is molded, the resin defining the exterior material 3 flows in a well-balanced manner.

The second metal terminal 100B includes a second notch 160B, a second opening portion 170B, and a fourth notch 180B.

The second notch 160B continuously extends from the end of the second bonding portion 110B to a position in the middle of the second rising portion 120B. With such a configuration, for example, when the exterior material 3 is molded, the resin defining the exterior material 3 flows through the second notch 160B, such that the gap portion G is easily filled with the resin. Furthermore, since the resin defining the exterior material 3 is provided in the second notch 160B, the resin on one surface side and the resin on the other surface side of the second rising portion 120B of the second metal terminal 100B are connected by the resin in the second notch 160B, such that the structure becomes stronger. Since the cut-away portion of the second notch 160B extends to a position in the middle of the second rising portion 120B, the strength of the second metal terminal 100B is improved. Since the second rising portion 120B of a preferred embodiment of the present invention is sloped, for example, during molding of the exterior material 3, the resin defining the exterior material 3 is likely to enter the gap portion G and flow through the second notch 160B.

The rising height T3 of the second notch 160B in the height direction T is preferably about half or less the rising height T2 of the second rising portion 120B in the height direction T. With such a configuration, for example, when the exterior material 3 is molded, it is possible to improve the strength of the second metal terminal 100B while ensuring the flowability of the resin constituting the exterior material 3.

The second bonding portion 110B includes a third bonding piece 111B on the first lateral surface WS1 side and a fourth bonding piece 112B on the second lateral surface WS2 side which are divided by the second notch 160B.

The second opening portion 170B is provided at the second extension portion 130B. With such a configuration, by providing the second metal terminal 100B with the second opening portion 170B in addition to the second notch 160B described above, it is possible to further improve the flowability of the resin constituting the exterior material 3 during molding of the exterior material 3, for example. Furthermore, since the resin defining the exterior material 3 is provided in the second opening portion 170B, the resin on one surface side and the resin on the other surface side of the second extension portion 130B of the second metal terminal 100B are connected by the resin in the second opening portion 170B, such that the structure becomes stronger. According to the above configuration, it is preferable that the same material defining the exterior material 3 is provided in the portion of the second notch 160B in the second rising portion 120B and the second opening portion 170B. With such a configuration, the structure of the multilayer ceramic capacitor 1 becomes strong.

The fourth notch 180B continuously extends from the end of the second mounting portion 150B to a position in the middle of the second falling portion 140B.

As shown in FIG. 11, the length W2 in the width direction of the second bonding portion 110B of the second metal terminal 100B is longer than the length W3 in the width direction of the second rising portion 120B. With such a configuration, it is possible to ensure a wide bonding area between the second external electrode 40B and the second metal terminal 100B by the second bonding material 5B. In particular, even when the second notch 160B is provided as described above, it is still possible to ensure a wide bonding area between the second external electrode 40B and the second metal terminal 100B by the second bonding material 5B.

The length W4 in the width direction W of the second notch 160B may be equal to or substantially equal to the length W5 in the width direction W of the second opening portion 170B. The rising height T3 of the second notch 160B in the height direction T may be the same or approximately the same as the length L6 in the length direction L of the second opening portion 170B. For example, the area of the second notch 160B in the second rising portion 120B may fall within a range from, for example, about 50% to about 200% of the area of the second opening portion 170B. With such a configuration, for example, when the exterior material 3 is molded, the resin defining the exterior material 3 flows in a well-balanced manner.

In a preferred embodiment of the present invention, the first bonding portion 110A of the first metal terminal 100A is divided by the first notch 160A. Furthermore, the second bonding portion 110B of the second metal terminal 100B is divided by the second notch 160B. The advantageous effects derived from such a configuration will be described with reference to FIGS. 13A and 13B.

Figure 13A:
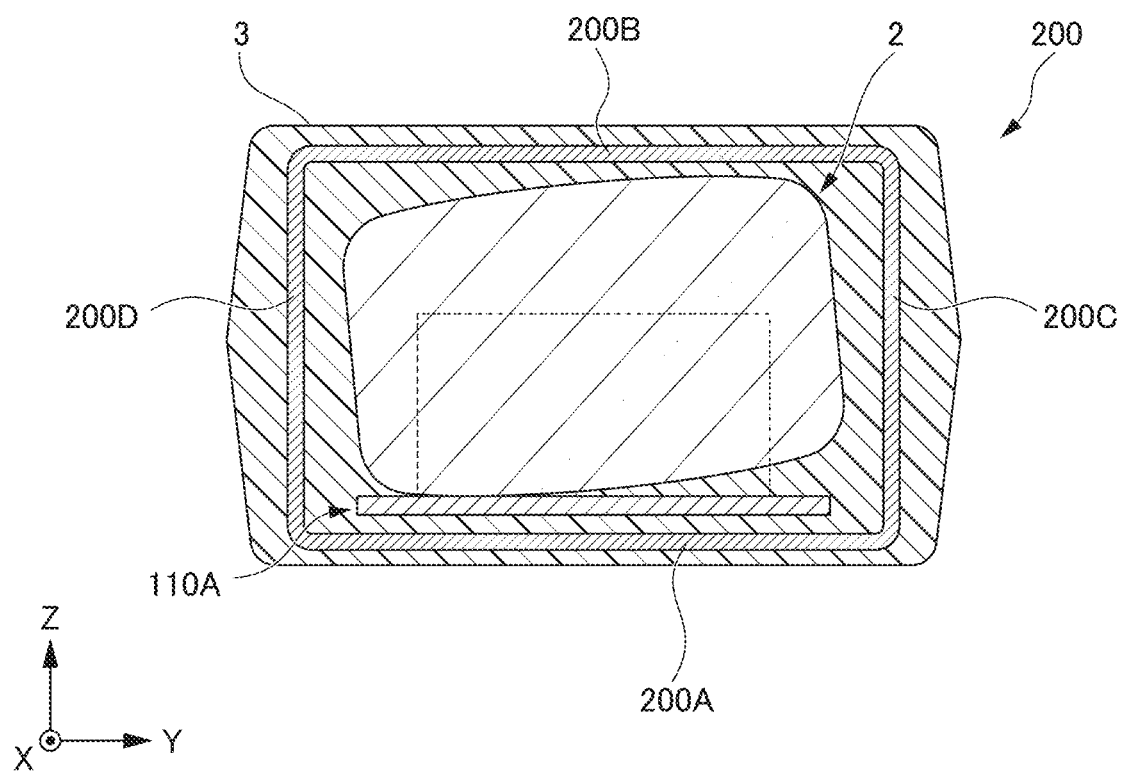
FIG. 13A is a schematic cross-sectional view taken along the line XIII-XIII of the multilayer ceramic capacitor 1 of FIGS. 6A and 6B, and is a schematic view for explaining the influence caused by the presence or absence of a first notch.
Figure 13B:
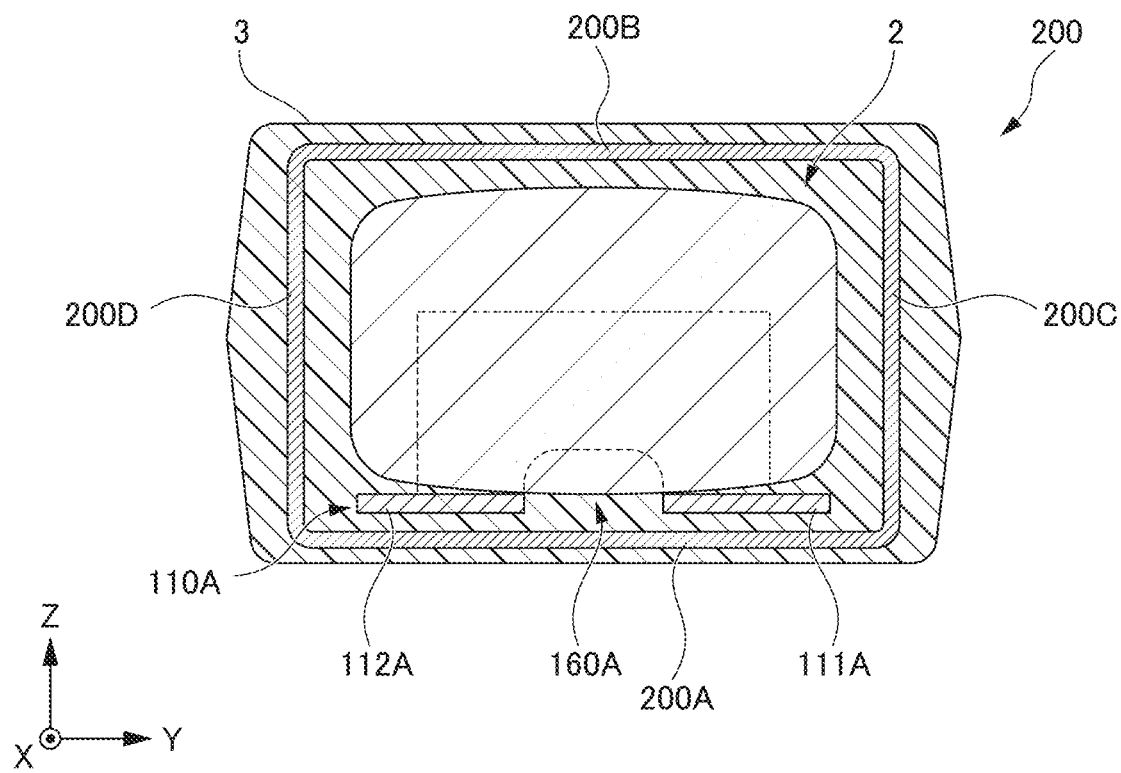
FIG. 13B is a schematic cross-sectional view taken along the line XIII-XIII of the multilayer ceramic capacitor 1 of FIGS. 6A and 6B, and is a schematic view for explaining the influence caused by the presence or absence of the first notch.

FIGS. 13A and 13B are each a schematic cross-sectional view taken along the line XIII-XIII of the multilayer ceramic capacitor 1 of FIGS. 6A and 6B, and is a schematic view for explaining the influence caused by the presence or absence of the first notch 160A. The first metal terminal 100A and the second metal terminal 100B are generally plane-symmetrical with respect to the cross section WT at the middle in the length direction L of the multilayer ceramic capacitor 1. Therefore, the first metal terminal 100A is illustrated and described as an example of the metal terminal 100.

FIG. 13A is a diagram showing a state of the multilayer ceramic capacitor main body 2, which may occur when the first bonding portion 110A is not provided with the first notch 160A.

As schematically shown in FIG. 13A, the cross section WT of the multilayer ceramic capacitor main body 2 after the external electrode 40 is provided is curved to bulge slightly due to its manufacturing method. In FIGS. 13A and 13B, the bulge is schematically emphasized. Because there is such bulging, in a case in which the first notch 160A is not provided in the first bonding portion 110A in the reflow step of bonding the multilayer ceramic capacitor main body 2, and the first metal terminal 100A and the second metal terminal 100B with each other, the multilayer ceramic capacitor main body 2 may rotate and tilt. In such a case, when the electrostatic shielding metal 200 is assembled, the surfaces of the electrostatic shielding metal 200 and the multilayer ceramic capacitor main body 2 are partially close to each other. Thus, the electrostatic shielding metal 200 and the external electrode 40 may contact each other, and the first external electrode 40A and the second external electrode 40B may short circuit.

As shown in FIG. 13B, and as shown in FIG. 11, in a preferred embodiment of the present invention, the first bonding portion 110A of the first metal terminal 100A includes a first bonding piece 111A on the first lateral surface WS1 side and a second bonding piece 112A on the second lateral surface WS2 side which are divided by the first notch 160A. Similarly, the second bonding portion 110B of the second metal terminal 100B includes a third bonding piece 111B on the first lateral surface WS1 side and a fourth bonding piece 112B on the second lateral surface WS2 side which are divided by the second notch 160B. Thus, as shown in FIG. 13B, since the two bonding pieces support the slightly curved multilayer ceramic capacitor main body, the multilayer ceramic capacitor main body 2 is unlikely to tilt. Therefore, it is possible to ensure the distance between the electrostatic shielding metal 200 and the surface of the multilayer ceramic capacitor main body 2.

The first metal terminal 100A and the second metal terminal 100B each include a terminal main body and a plating film provided on the surface of the terminal main body.

The terminal main body is preferably made of, for example, Ni, Fe, Cu, Ag, Cr, or an alloy including one or more metals selected from these metals as a main component. For example, the metal of the base material of the terminal main body may be an Fe-42Ni alloy, an Fe-18Cr alloy, or a Cu-8Sn alloy. Furthermore, from the viewpoint of heat dissipation, the metal of the base material of the terminal main body may be, for example, oxygen-free copper or Cu-based alloy having high thermal conductivity. Thus, with such a copper-base material having high thermal conductivity for the material of the first terminal main body, it is possible to achieve low ESR and low thermal resistance. Furthermore, in a preferred embodiment of the present invention, for example, stainless steel or aluminum having low solder wettability may be used for the metal of the base material of the terminal main body. At least the surface of the metal of the base material of the terminal main body has lower solder wettability than the surface of the plating film of the outermost surface. The thickness of the terminal main body is preferably, for example, about 0.05 mm or more and about 0.5 mm or less.

The plating film preferably includes an upper plating film provided on the outermost surface of the plating film and a lower plating film provided below the upper plating film. For example, the plating film may include a two-layer structure in which the upper plating film is provided on the lower plating film. The lower plating film preferably includes, for example, Ni, Fe, Cu, Ag, Cr, or an alloy including one or more selected from these metals as a main component. More preferably, the lower plating film preferably includes, for example, Ni, Fe, Cr, or an alloy including one or more selected from these metals as a main component. Since the lower plating film includes Ni, Fe, Cr having a high melting point, or an alloy including one or more selected from these metals as a main component, it is possible to improve the heat resistance of the metal terminal 100. The thickness of the lower plating film is preferably, for example, about 0.2 μm or more and about 5.0 μm or less. The upper plating film is preferably made of, for example, Sn, Ag, Au, or an alloy including one or more selected from these metals as a main component. More preferably, the upper plating film is made of Sn or an alloy containing Sn as a main component. Since the upper plating film includes, for example, Sn or an alloy including Sn as a main component, it is possible to improve the solderability between the external electrode 40 and the metal terminal 100. The thickness of the upper plating film is preferably, for example, about 1.0 μm or more and about 5.0 μm or less.

The upper plating film provided on the outermost surface of the plating film has a higher wettability of solder than the surface of the metal of the base material of the terminal main body. In addition, the upper plating film provided on the outermost surface of the plating film has a higher wettability of solder than the surface of the lower plating film. For example, the lower plating film is preferably a Ni plating film. The upper plating film is preferably, for example, a Sn plating film.

The first metal terminal 100A and the second metal terminal 100B may each include an exposed surface in which a material inside the plating film on the outermost surface of the plating film is exposed at a portion of the surface. By providing an exposed surface on a portion of the surface, solder is less likely to be attached to the exposed surface, such that it is possible to reduce or prevent the occurrence of a disadvantage such as solder splash.

Here, the exposed surface may be a surface on which the lower plating film is exposed. The solder wettability of the lower plating film is lower than that of the upper plating film. The exposed surface may be a surface on which the base material of the terminal main body is exposed. The surface of the base material of the terminal main body is lower in wettability of solder than the upper plating film.

The exposed surface may be formed by forming a plating film on the terminal main body, and then removing the plating film. The removing process may be, for example, a mechanical removing process by grinding or polishing, a removing process by laser trimming, or a removing process by a plating release agent such as sodium hydroxide. Before the plating film is formed, a portion to be formed as an exposed surface may be covered with a resist. In this case, the exposed surface is formed by removing the resist after the plating film is formed.

When the dimension in the length direction of the multilayer ceramic capacitor 101 including the exterior material 3 and the metal terminal 100 is defined as L, the dimension L is preferably, for example, about 3.2 mm or more and about 20 mm or less. Furthermore, when the dimension in the lamination direction of the multilayer ceramic capacitor 1 is defined as T, the dimension T is preferably, for example, about 1.0 mm or more and about 10 mm or less. Furthermore, when the dimension in the width direction of the multilayer ceramic capacitor 1 is defined as W, the dimension W is preferably, for example, about 1.5 mm or more and about 20 mm or less.

Next, a non-limiting example of a method of manufacturing the multilayer ceramic capacitor 1 of the present preferred embodiment will be described. First, a method of manufacturing the multilayer ceramic capacitor main body 2 will be described.

A dielectric sheet for the dielectric layer 20 and a conductive paste for the internal electrode layer 30 are provided. The conductive paste for the internal electrode and the dielectric sheet includes a binder and a solvent. Known binders and solvents may be used.

The conductive paste for the internal electrode layer 30 is printed on the dielectric sheet in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are provided.

A predetermined number of dielectric sheets in which the pattern of the internal electrode layer is not printed are laminated (stacked), such that a portion defining and functioning as the first main surface-side outer layer portion 12 close to the first main surface TS1 is formed. The dielectric sheet in which the pattern of the first internal electrode layer 31 is printed and the dielectric sheet in which the pattern of the second internal electrode layer 32 is printed are sequentially laminated thereon, such that a portion defining and functioning as the inner layer portion 11 is formed. A predetermined number of the dielectric sheets in which the pattern of the internal electrode layer is not printed are laminated on the portion defining and functioning as the inner layer portion 11, such that a portion serving as the second main surface-side outer layer portion 13 close to the second main surface TS2 is formed. Thus, a laminated sheet is manufactured.

The laminated sheets are pressed in the lamination direction by hydrostatic pressing, for example, such that a laminated block is manufactured.

The laminated block is cut to a predetermined size, such that a laminated (multilayer) chip is cut out. At this time, corner portions and ridge portions of the laminated chip may be rounded by barrel polishing or the like.

The laminated chip is fired to manufacture the multilayer body 10. The firing temperature depends on the materials of the dielectric layer 20 and the internal electrode layer 30. However, the firing temperature is preferably, for example, about 900° C. or more and about 1400° C. or less.

The conductive paste defining and functioning as the first base electrode layer 50A and the second base electrode layer 50B is applied to both end surfaces of the multilayer body 10. In a preferred embodiment of the present invention, the first base electrode layer 50A and the second base electrode layer 50B are fired layers. For example, a conductive paste including a glass component and metal is applied to the multilayer body 10 by, for example, a method such as dipping. Thereafter, a firing process is performed to form the first base electrode layer 50A and the second base electrode layer 50B. The temperature of the firing process at this time is preferably, for example, about 700° C. or higher and about 900° C. or lower.

In a case in which the laminated chip before firing and the conductive paste applied to the laminated chip are fired simultaneously, it is preferable that the fired layer is formed by firing a ceramic material added instead of a glass component. At this time, it is particularly preferable to use the same type of ceramic material as the dielectric layer 20 as the ceramic material to be added. In this case, the conductive paste is applied to the laminated chip before firing, and the laminated chip and the conductive paste applied to the laminated chip are fired simultaneously to form the multilayer body 10 including the fired layer formed therein.

When a thin film layer is formed as the first base electrode layer 50A and the second base electrode layer 50B, a thin film layer may be formed on a portion of the first main surface TS1 and a portion of the second main surface TS2 of the multilayer body 10. The thin film layer may be, for example, a sputtering electrode fabricated by a sputtering method. In a case in which the sputtering electrode is formed on a portion of the first main surface TS1 and a portion of the second main surface TS2 of the multilayer body 10 as the first base electrode layer 50A and the second base electrode layer 50B, a fired layer is formed on the first end surface LS1 and on the second end surface LS2. Alternatively, a plated layer, which will be described later, may be formed directly on the multilayer body 10 without forming the base electrode layer on the first end surface LS1 and the second end surface LS2.

Thereafter, the first plated layer 60A is formed on the first base electrode layer 50A. Furthermore, the second plated layer 60B is formed on the second base electrode layer 50B. In a preferred embodiment of the present invention, the Ni-plated layer and the Sn-plated layer are formed as the plated layers. The Ni-plated layer and the Sn-plated layer are sequentially formed, for example, by a barrel plating method.

By such a manufacturing process, the multilayer ceramic capacitor main body 2 is manufactured.

Next, a non-limiting example of a method of manufacturing the first metal terminal 100A and the second metal terminal 100B will be described.

A plating film is applied to the terminal main body to define the first metal terminal 100A and the second metal terminal 100B. Then, the film defining at least the outermost surface of the plating film is peeled off at a portion where it is not desired to adhere the solder. With such a configuration, an exposed surface is formed in which the surface with low wettability of the solder is exposed. Alternatively, the terminal main body in a state in which the surface of the portion where the solder is not desired to be attached is masked with a resist or the like is plated. With such a configuration, an exposed surface may be formed in which the surface with low wettability of the solder is exposed.

Next, a process of bonding the multilayer ceramic capacitor main body 2, and the first metal terminal 100A and the second metal terminal 100B with each other will be described.

The first external electrode 40A and the first metal terminal 100A are bonded by the first bonding material 5A. The second external electrode 40B and the second metal terminal 100B are bonded by the second bonding material 5B. In a preferred embodiment of the present invention, the first bonding material 5A and the second bonding material 5B are, for example, solder. For example, in the case of soldering by reflow, the first bonding material 5A and the second bonding material 5B are heated, for example, at a temperature of about 270° C. or higher and about 290° C. or lower for about 30 seconds or longer.

By the heating during the reflow, the first bonding material 5A and the second bonding material 5B are melted. Thereafter, the first bonding material 5A is solidified, and the multilayer ceramic capacitor main body 2 and the first metal terminal 100A are bonded to each other. Furthermore, the second bonding material 5B is solidified, and the multilayer ceramic capacitor main body 2 and the second metal terminal 100B are bonded to each other.

Figure 14A:
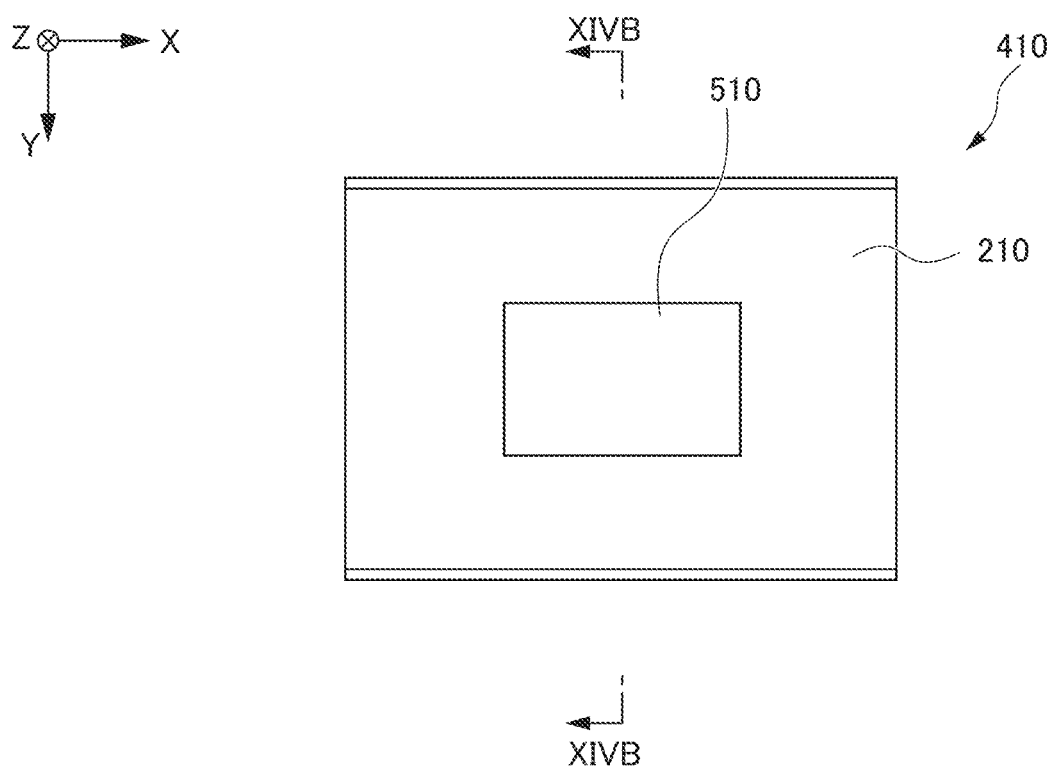
FIG. 14A is a view showing a first metal plate having a U-shaped cross section, which defines an electrostatic shielding metal according to a preferred embodiment of the present invention.
Figure 14B:
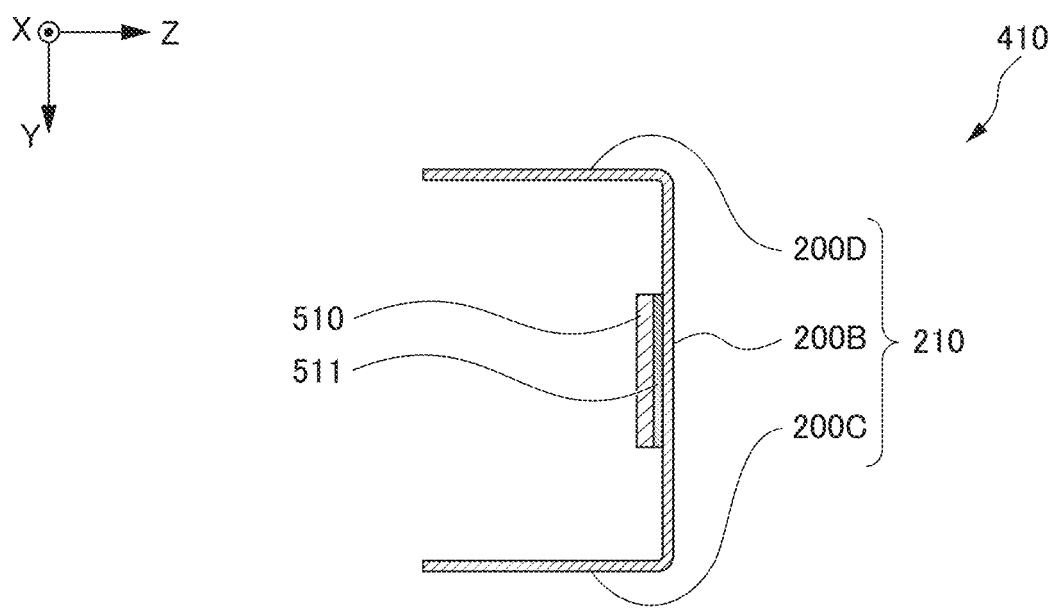
FIG. 14B is a cross-sectional view taken along the line XIVB-XIVB of the first metal plate of FIG. 14A.
Figure 15A:
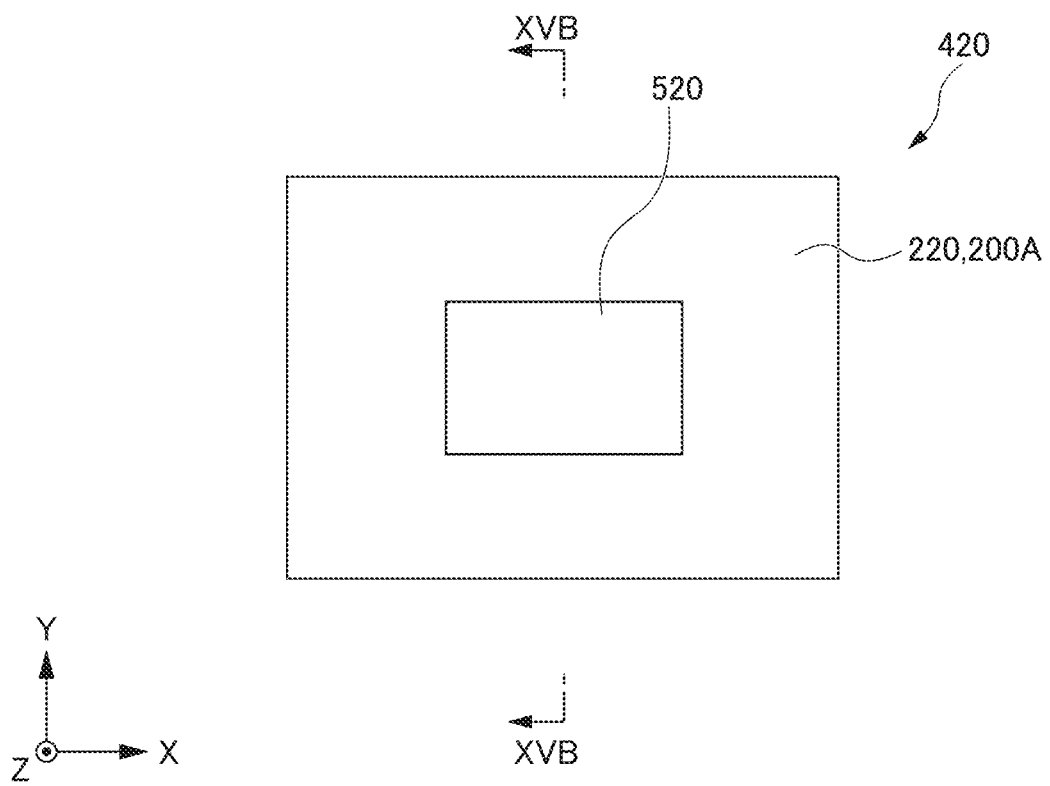
FIG. 15A is a view showing a plate-shaped second metal plate defining an electrostatic shielding metal according to a preferred embodiment of the present invention.
Figure 15B:
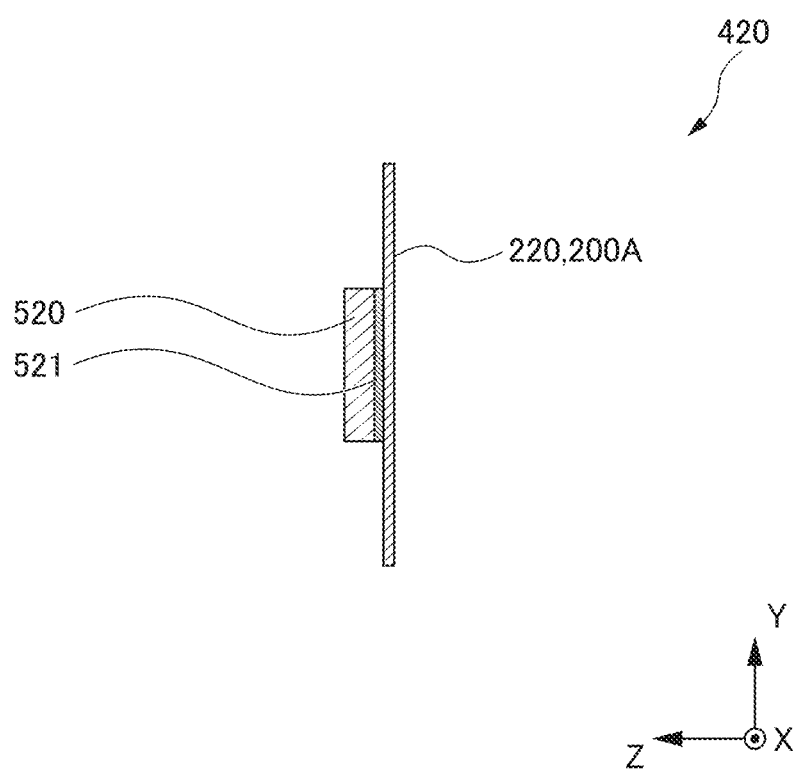
FIG. 15B is a cross-sectional view taken along the line XVB-XVB of the second metal plate of FIG. 15A.
Figure 16A:
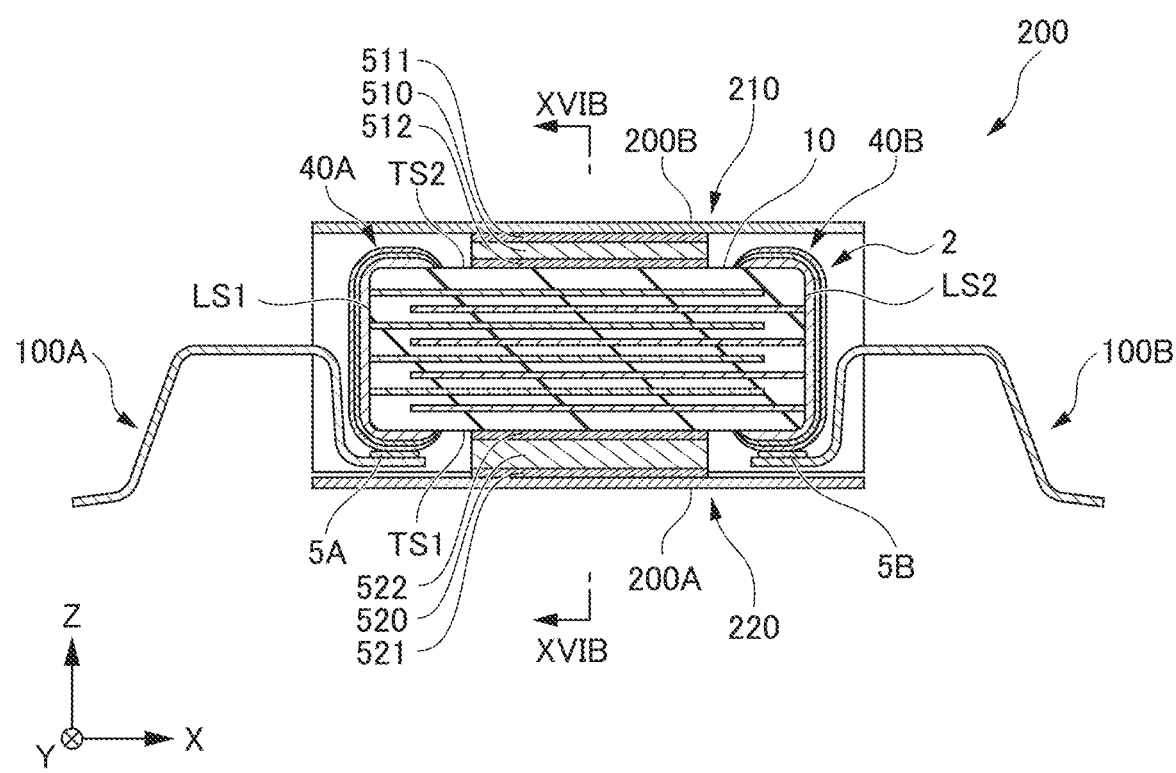
FIG. 16A is a diagram showing a state in which an electrostatic shielding metal is provided in a multilayer ceramic capacitor main body according to a preferred embodiment of the present invention.
Figure 16B:
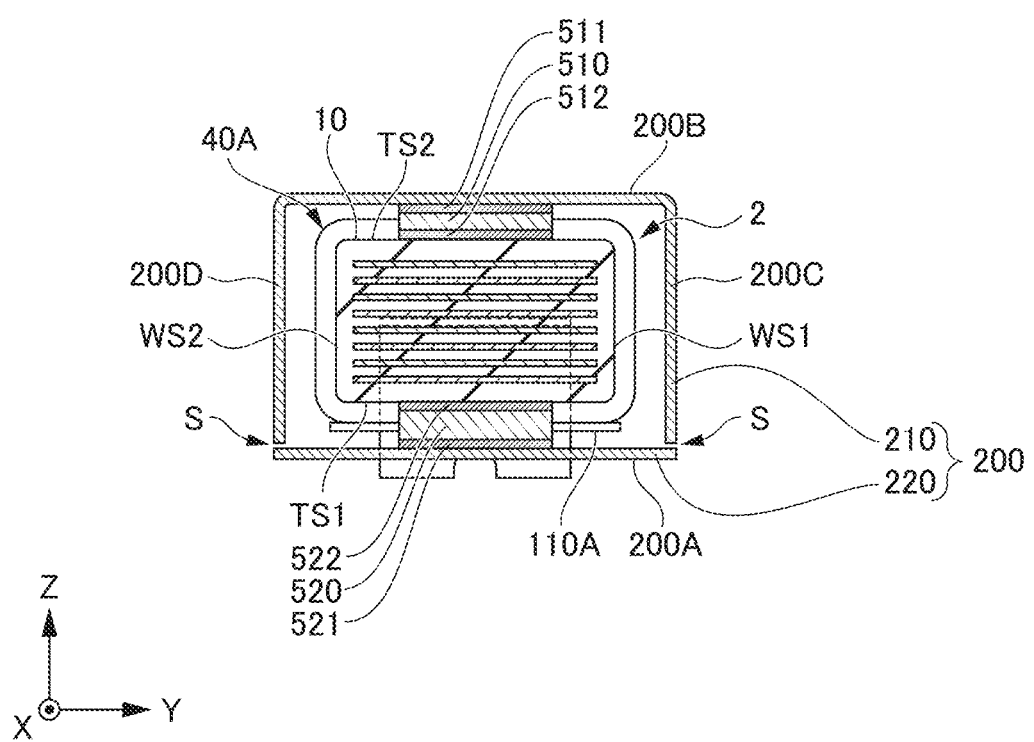
FIG. 16B is a cross-sectional view taken along the line XVIB-XVIB of the multilayer ceramic capacitor main body in which the electrostatic shielding metal shown in FIG. 16A is provided.

A process of providing the electrostatic shielding metal 200 so as to cover the multilayer ceramic capacitor main body 2 will be described with reference to FIGS. 14A to 16B. FIG. 14A is a view showing the first metal plate 210 having a U-shaped cross section defining the electrostatic shielding metal 200, and is an arrow view when viewed in the height direction from the first main surface TS1 side toward the second main surface TS2 side. FIG. 14B is a cross-sectional view of the first metal plate 210 of FIG. 14A taken along the line XIVB-XIVB. FIG. 15A is a view showing the plate-shaped second metal plate 220 constituting the electrostatic shielding metal 200, and is an arrow view when viewed in the height direction from the second main surface TS2 side toward the first main surface TS1 side. FIG. 15B is a cross-sectional view taken along the line XVB-XVB of the second metal plate 220 of FIG. 15A. FIG. 16A shows a state in which the electrostatic shielding metal 200 is provided in the multilayer ceramic capacitor main body 2. FIG. 16B is a cross-sectional view taken along the line XVIB-XVIB of the multilayer ceramic capacitor main body 2 in which the electrostatic shielding metal 200 shown in FIG. 16A is provided.

First, the first metal plate 210 having a U-shaped cross section shown in FIGS. 14A and 14B is prepared. The first metal plate 210 is molded by bending one metal plate. In a preferred embodiment of the present invention, the first metal plate 210 having a U-shaped cross section constitutes the second shielding portion 200B covering at least a portion of the second main surface TS2, the third shielding portion 200C covering at least a portion of the first lateral surface WS1, and the fourth shielding portion 200D covering at least a portion of the second lateral surface WS2 of the multilayer body 10. Next, the rectangular parallelepiped insulating layer 510 is bonded to the U-shaped bottom surface of the first metal plate 210 by using an adhesive 511. This is referred to as a first metal shield component 410.

Next, a plate-shaped second metal plate 220 shown in FIGS. 15A and 15B is prepared. In a preferred embodiment of the present invention, the plate-shaped second metal plate 220 constitutes the first shielding portion 200A that covers at least a portion of the first main surface TS1 of the multilayer body 10. Next, the insulating layer 520 having a rectangular or substantially rectangular parallelepiped shape is bonded to the second metal plate 220 using the adhesive 521. This is referred to as a second metal shield component 420.

The thicknesses of the insulating layers 510 and 520 are preferably, for example, about 0.4 mm or more and about 2 mm or less. The dimension in the length direction L of the insulating layers 510 and 520 is preferably, for example, about 50% or more and about 80% or less of the dimension L3 in the length direction L of the portion of the surface of the multilayer body 10 exposed from the external electrode 40. The dimension in the width direction W of the insulating layers 510 and 520 is preferably, for example about 50% or more and about 80% or less of the dimension in the width direction W of the multilayer body 10.

Next, as shown in FIGS. 16A and 16B, the adhesive 512 is used to bond the first metal shield component 410 to the second main surface TS2 of the multilayer body 10 of the multilayer ceramic capacitor main body 2. Furthermore, the adhesive 522 is used to bond the second metal shield component 420 to the first main surface TS1 of the multilayer body 10 of the multilayer ceramic capacitor main body 2. With such a configuration, the electrostatic shielding metal 200 is provided to cover the multilayer ceramic capacitor main body 2.

The portion S where the first metal plate 210 and the second metal plate 220 are close to each other as shown in FIG. 16B may be bonded or may remain as a slit without being bonded.

According to such a manufacturing method, the electrostatic shielding metal 200 can be easily provided. In particular, even after the first metal terminal 100A and the second metal terminal 100B are bonded to the multilayer ceramic capacitor main body 2, the electrostatic shielding metal 200 can be easily provided. According to such a manufacturing method, the entire or substantially the entire exposed surface of the multilayer body 10 of the multilayer ceramic capacitor main body 2 can be easily covered by the electrostatic shielding metal 200. The first metal terminal 100A and the second metal terminal 100B may be bonded to the terminal multilayer ceramic capacitor main body 2 after the electrostatic shielding metal 200 is provided to cover the terminal multilayer ceramic capacitor main body 2.

Next, a process of covering the multilayer ceramic capacitor main body 2, the electrostatic shielding metal 200, the first bonding material 5A and the second bonding material 5B, a portion of the first metal terminal 100A, and a portion of the second metal terminal 100B with the exterior material 3 will be described.

The exterior material 3 is formed by, for example, a transfer molding method. More specifically, a multilayer ceramic capacitor before being covered with the exterior material 3, i.e., a multilayer ceramic capacitor main body 2 provided with the metal terminals 100 and the electrostatic shielding metal 200, is disposed in the mold. Then, the mold is filled with a resin, and the resin is cured to form the exterior material 3. Thus, the exterior material 3 is provided so as to cover the multilayer ceramic capacitor main body 2, the electrostatic shielding metal 200, the first bonding material 5A and the second bonding material 5B, a portion of the first metal terminal 100A, and a portion of the second metal terminal 100B. At this time, the space between multilayer ceramic capacitor main body 2 and the electrostatic shielding metal 200 is also filled with the exterior material 3. The gap portion G is also filled with the exterior material 3.

The electrostatic shielding metal 200 may be formed as a metal thin film by, for example, plating, sputtering, vapor deposition, or the like. In this case, for example, first, the exterior material 3 is provided so as to cover the multilayer ceramic capacitor main body 2, the first bonding material 5A and the second bonding material 5B, a portion of the first metal terminal 100A, and a portion of the second metal terminal 100B by the first molding step. Then, in the thin film forming step, a metal thin film defining and functioning as the electrostatic shielding metal 200 is formed on the surface of the exterior material 3. Thereafter, the exterior material 3 is provided so as to cover the electrostatic shielding metal 200 formed in the thin film forming step by the second molding step. This makes it possible to reduce the thickness of the electrostatic shielding metal, and therefore, it is possible to reduce or prevent an increase in the size of the multilayer ceramic capacitor 1.

When the electrostatic shielding metal 200 is made of the metal plate described above, it is possible to form the exterior material 3 with one molding step. When the electrostatic shielding metal 200 is made of a metal thin film, mask processing needs to be performed after the first molding step in order to prevent short circuit between the first metal terminal 100A and the second metal terminal 100B. However, when the electrostatic shielding metal 200 is made of a metal plate, such mask processing becomes unnecessary.

Finally, if there is an unnecessary portion in the metal terminal 100, the unnecessary portion is cut using, for example, a stamping die or the like. Then, the metal terminal 100 is bent into a desired shape using a bending die or the like. Thus, the metal terminal 100 may be formed by bending. That is, each connecting portion of the metal terminal 100 formed by bending may be formed by bending. The bending process is partially performed before molding the exterior material 3.

According to the above-described manufacturing method, the multilayer ceramic capacitor 1 of a preferred embodiment of the present invention is manufactured.

FIG. 17 shows a mounting structure 300 of the multilayer ceramic capacitor 1. FIG. 17 is an external perspective view showing the mounting structure 300 in which the multilayer ceramic capacitor 1 of a preferred embodiment of the present invention is mounted on a mounting board 310.

Thereafter, the multilayer ceramic capacitor 1 which is covered with the exterior material 3 and completed is reflow-mounted as a component on the mounting board 310 via a substrate mounting bonding material 320.

More specifically, the first metal terminal 100A and the second metal terminal 100B are bonded to a wiring member 312 provided on the mounting surface 311 of the mounting board 310 via the substrate mounting bonding material 320. The second metal terminal 100B is bonded to the wiring member 312 provided on the mounting surface 311 of the mounting board 310 via the substrate mounting bonding material 320.

At this time, the volume of the bonding material 5 may expand due to melting of the bonding material 5. However, since the gap portion G is filled with the exterior material 3, it is possible to reduce or prevent the occurrence of disadvantages such as solder splash.

Figure 18:
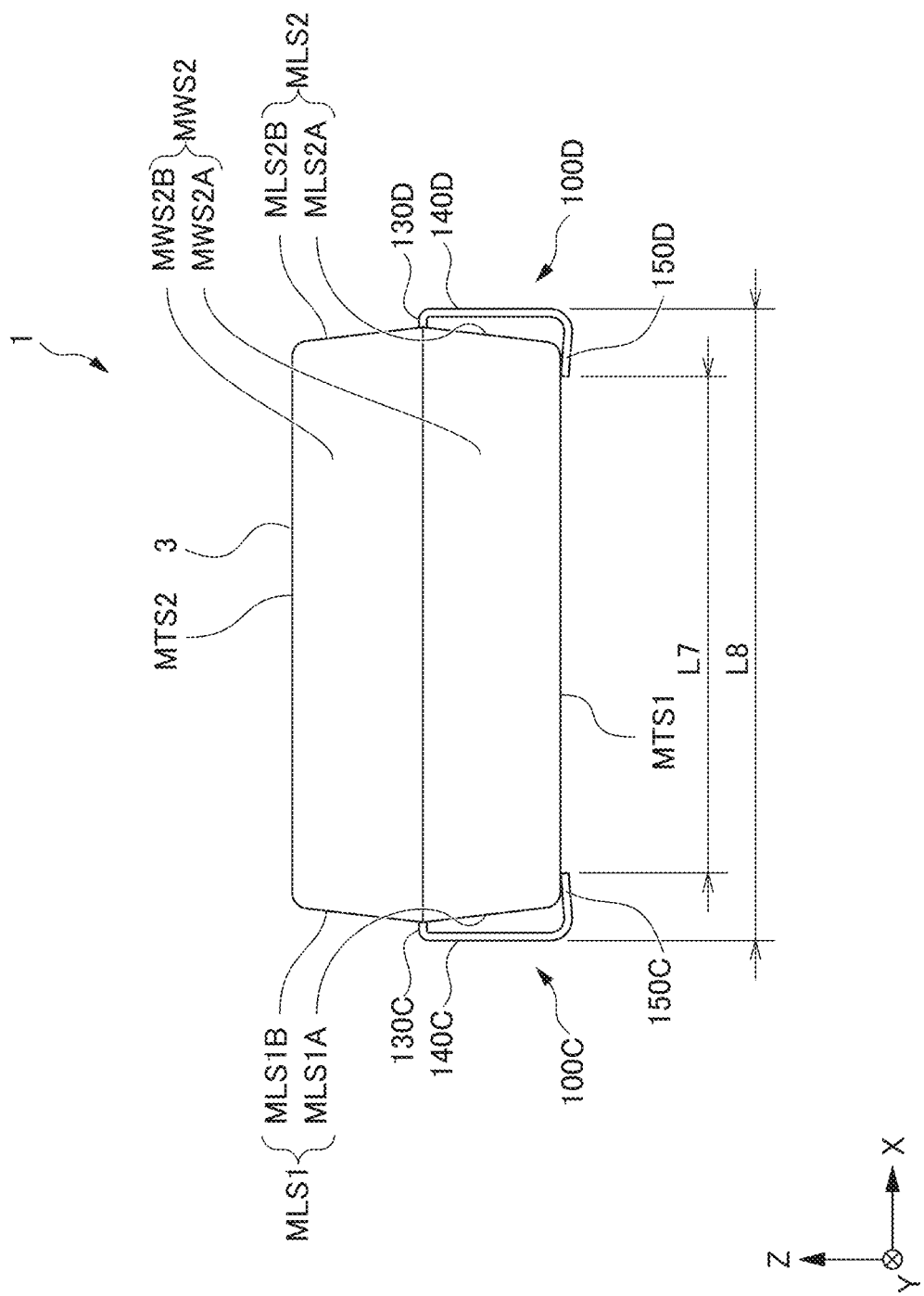
FIG. 18 is a diagram showing a modified example of a multilayer ceramic capacitor according to a preferred embodiment of the present invention, and corresponds to FIG. 2.

Hereinafter, a modified example of the multilayer ceramic capacitor 1 according to a preferred embodiment of the present invention will be described. In the following description, the same or corresponding components as those in the above preferred embodiment are denoted by the same reference numerals, and a detailed description thereof is omitted. FIG. 18 is a diagram showing a modified example of the multilayer ceramic capacitor 1 according to a preferred embodiment of the present invention, and corresponds to FIG. 2.

In this modified example, the configuration of the metal terminal is different from that of the above-described preferred embodiment. The metal terminal of the modified example includes a first metal terminal 100C and a second metal terminal 100D.

The configuration of a portion of the first metal terminal 100C provided inside the exterior material 3 is the same or substantially the same as the configuration of the first metal terminal 100A of the above preferred embodiment. The configuration of the portion of the second metal terminal 100D provided inside the exterior material 3 is the same or substantially the same as the configuration of the second metal terminal 100B of the above-described preferred embodiment.

The first metal terminal 100C includes a first extension portion 130C, a first falling portion 140C, and a first mounting portion 150C. The first extension portion 130C is connected to the first falling portion 140C immediately after protruding from the surface MLS1 of the exterior material 3 on the first end surface LS1 side. The connecting portion between the first extension portion 130C and the first falling portion 140C is formed by bending at a right angle or substantially a right angle. The first falling portion 140C extends in a direction orthogonal or substantially orthogonal to the mounting surface toward the mounting surface. The first mounting portion 150C extends along the mounting surface toward the middle side in the length direction L of the multilayer ceramic capacitor 1.

The second metal terminal 100D includes a second extension portion 130D, a second falling portion 140D, and a second mounting portion 150D. The second extension portion 130D is connected to the second falling portion 140D immediately after protruding from the surface MLS2 of the exterior material 3 on the side of the second end surface LS2. The connecting portion between the second extension portion 130D and the second falling portion 140D is formed by bending at a substantially right angle. The second falling portion 140D extends in a direction orthogonal or substantially orthogonal to the mounting surface toward the mounting surface. The second mounting portion 150D extends along the mounting surface toward the middle side in the length direction L of the multilayer ceramic capacitor 1.

This makes it possible to shorten the dimension L8 in the length direction of the multilayer ceramic capacitor 1 including the first metal terminal 100C and the second metal terminal 100D. Therefore, it is possible to reduce the mounting area required for mounting the multilayer ceramic capacitor 1 on the mounting board.

Also in this case, the separation distance L7 between the end of the first mounting portion 150C of the first metal terminal 100C and the end of the second mounting portion 150D of the second metal terminal 100D is preferably longer than the separation distance L3 between the first external electrode 40A and the second external electrode 40B of the multilayer ceramic capacitor main body 2 shown in FIG. 5.

In the multilayer ceramic capacitor main body 2 according to a preferred embodiment of the present invention, the plurality of the first internal electrode layers 31 and the plurality of the second internal electrode layers 32 are provided alternately in the height direction T of the multilayer body 10. However, the configuration of the multilayer ceramic capacitor main body 2 is not limited thereto. The plurality of the first internal electrode layers 31 and the plurality of the second internal electrode layers 32 may be alternately provided in the width direction W of the multilayer body 10.

In this case, the first extension portion of the first internal electrode layers 31 may extend out toward the first main surface TS1 on the first end surface LS1 side, and the first external electrode 40A may be provided on the first main surface TS1 only on the first end surface LS1 side. That is, the first end surface LS1 may not be provided with the first external electrode 40A. In this case, the first surface S1 on the first end surface LS1 side of the multilayer ceramic capacitor main body 2 is composed of the first end surface LS1 of the multilayer body 10. Alternatively, the second extension portion of the second internal electrode layers 32 may extend out toward the first main surface TS1 on the second end surface LS2 side, and the second external electrode 40B may be provided on the first main surface TS1 only on the second end surface LS2 side. That is, the second end surface LS2 may not be provided with the second external electrode 40B. In this case, the first surface S1 on the second end surface LS2 side of the multilayer ceramic capacitor main body 2 is composed of the second end surface LS2 of the multilayer body 10. In this case, the bonding material 5 hardly wets in the gap portion G.

In a preferred embodiment of the present invention, one multilayer ceramic capacitor main body 2 is covered with the exterior material 3 to provide the multilayer ceramic capacitor 1. However, the present invention is not limited thereto. The multilayer ceramic capacitor main body 2 as the plurality of the multilayer ceramic electronic component main bodies may be covered with the exterior material 3 to provide the multilayer ceramic capacitor 1 as a multilayer ceramic electronic component. For example, a plurality of the multilayer ceramic capacitor main body 2 provided in parallel or substantially in parallel may be covered with the exterior material 3 to provide the multilayer ceramic capacitor 1. For example, multilayer ceramic capacitor main body 2 stacked in two or more stages may be covered with the exterior material 3 to provide the multilayer ceramic capacitor 1.

The configuration of the multilayer ceramic capacitor main body is not limited to the configuration shown in FIGS. 7 to 10. For example, the multilayer ceramic capacitor main body may be multilayer ceramic capacitors having a two-portion structure, a three-portion structure, or a four-portion structure as shown in FIGS. 19A, 19B, and 19C.

Figure 19A:
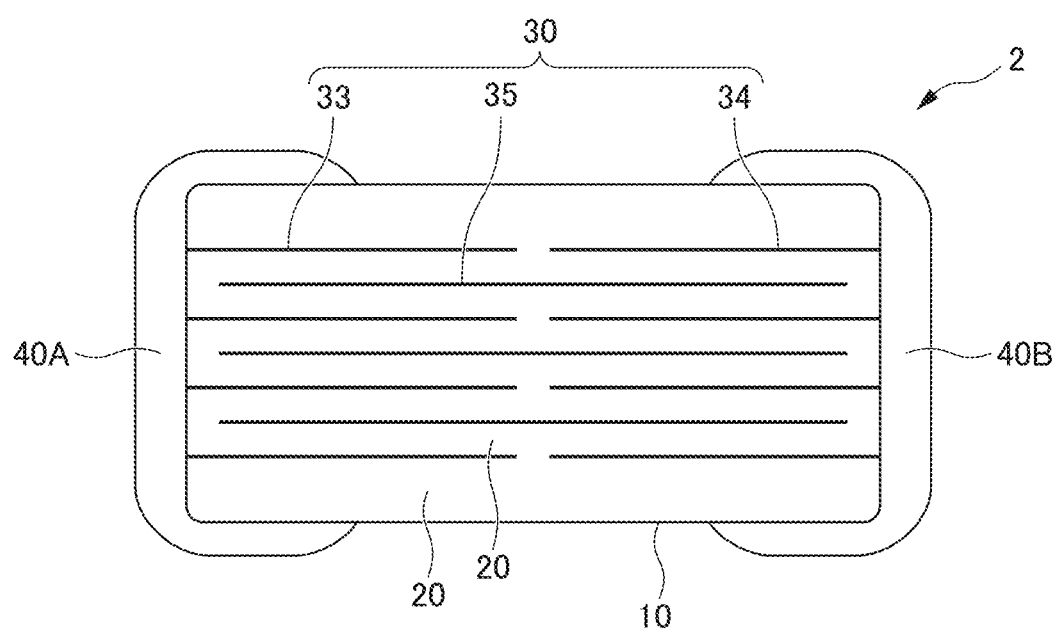
FIG. 19A is a diagram showing a multilayer ceramic capacitor having a two-portion structure.
Figure 19B:
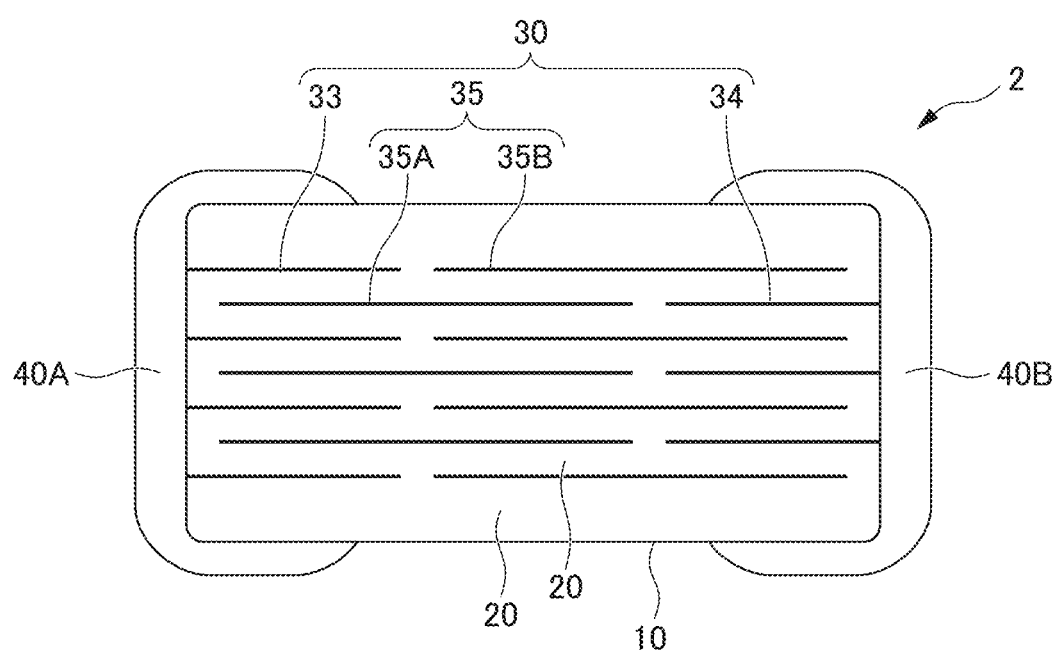
FIG. 19B is a diagram showing a multilayer layer ceramic capacitor having a three-portion structure.
Figure 19C:
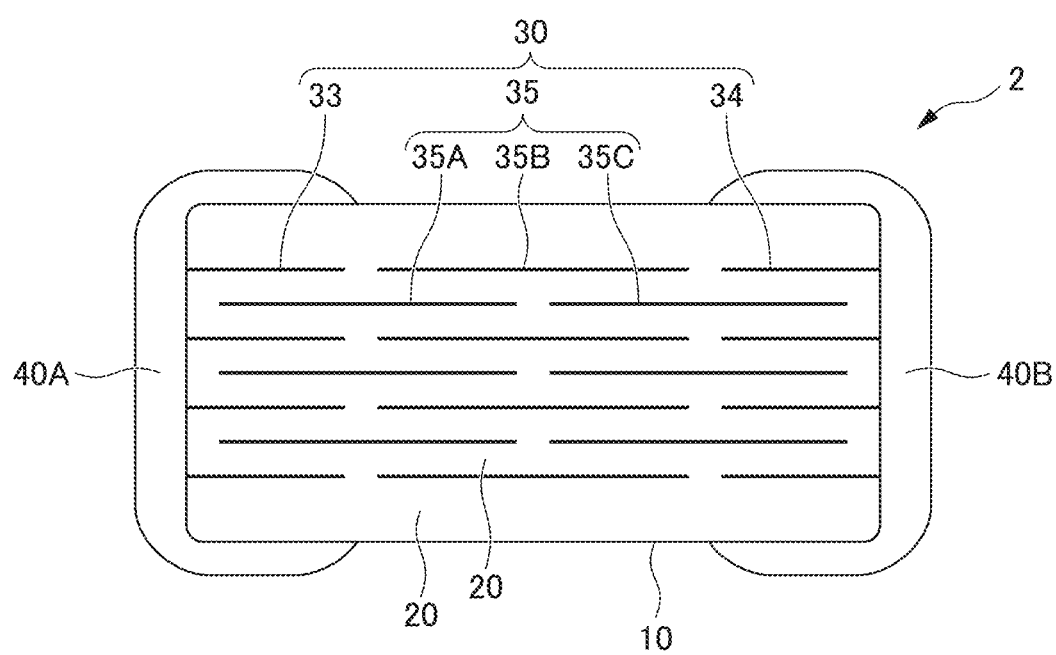
FIG. 19C is a diagram showing a multilayer layer ceramic capacitor having a four-portion structure.

A multilayer ceramic capacitor main body 2 shown in FIG. 19A is a multilayer ceramic capacitor main body 2 including a two-portion structure, and includes floating internal electrode layers 35, as the internal electrode layers 30, which neither extend to the first end surface LS1 or to the second end surface LS2, in addition to the first internal electrode layer 33 and the second internal electrode layer 34. A multilayer ceramic capacitor main body 2 shown in FIG. 19B is a multilayer ceramic capacitor main body 2 including a three-portion structure, and includes a first floating internal electrode layer 35A and a second floating internal electrode layer 35B as the floating internal electrode layers 35. A multilayer ceramic capacitor main body 2 shown in FIG. 19C is a multilayer ceramic capacitor main body 2 including a four-portion structure, and includes, as the floating internal electrode layers 35, a first floating internal electrode layer 35A, a second floating internal electrode layer 35B, and a third floating internal electrode layer 35C. Thus, by providing the floating internal electrode layers 35 as the internal electrode layers 30, the multilayer ceramic capacitor main body 2 includes a structure including a plurality of divided opposing electrode portions. With such a configuration, a plurality of capacitor components are provided between the opposing internal electrode layers 30, thus providing a configuration in which these capacitor components are connected in series. Therefore, the voltage applied to the respective capacitor components becomes low, and thus, it is possible to achieve a high breakdown voltage of the multilayer ceramic capacitor main body 2. The multilayer ceramic capacitor main body 2 of the present preferred embodiment may have a four or more-portion structure.

The multilayer ceramic capacitor main body 2 may be of a two-terminal type including two external electrodes, or may be of a multi-terminal type including a large number of external electrodes.

In the preferred embodiments described above of the present invention, a multilayer ceramic capacitor using a dielectric ceramic has been exemplified as the multilayer ceramic electronic components. However, the multilayer ceramic electronic component of the present invention is not limited thereto, and is applicable to various multilayer ceramic electronic components such as a piezoelectric component using a piezoelectric ceramic, a thermistor using a semiconductor ceramic, and an inductor using a magnetic ceramic. Examples of the piezoelectric ceramics include PZT (lead zirconate titanate) ceramics, examples of semiconductor ceramics include spinel ceramics, and examples of magnetic ceramics include ferrite.

According to the multilayer ceramic capacitor 1 as an example of a multilayer ceramic electronic component according to a preferred embodiment of the present invention, it is possible to achieve the following advantageous effects.

(1) A multilayer ceramic electronic component 1 according to a preferred embodiment of the present invention includes the multilayer ceramic electronic component main body 2 including the multilayer body 10, the first external electrode 40A, and the second external electrode 40B, the multilayer body 10 including the plurality of laminated ceramic layers 20 and the plurality of internal conductive layers 30 laminated on the ceramic layers 20, and further including the first main surface TS1 and the second main surface TS2 opposed to each other in the height direction, the first lateral surface WS1 and the second lateral surface WS2 opposed to each other in the width direction orthogonal or substantially orthogonal to the height direction, and the first end surface LS1 and the second end surface LS2 opposed to each other in the length direction orthogonal or substantially orthogonal to the height direction and the width direction, the first external electrode 40A being provided on the first end surface LS1 side, and the second external electrode 40B being provided on the second end surface LS2 side, the first metal terminal 100A connected to the first external electrode 40A, and the second metal terminal 100B connected to the second external electrode 40B, the multilayer ceramic electronic component 1 further including the exterior material 3 that covers the multilayer ceramic electronic component main body 2, a portion of the first metal terminal 100A, and a portion of the second metal terminal 100B, and the electrostatic shielding metal 200 embedded in the exterior material 3 and covering at least a portion of the multilayer ceramic electronic component main body 2, in which the electrostatic shielding metal 200 is provided between a surface of the exterior material 3 and a surface of the multilayer ceramic electronic component main body 2, and is provided at a position spaced away from the multilayer ceramic electronic component main body 2. With such a configuration, it is possible to provide a multilayer ceramic electronic component that is able to reduce or prevent leakage of an electric field generated in the electronic component to the surroundings.

Conventionally, a multilayer ceramic electronic component covered with an exterior material has a structure in which a large creepage distance is ensured by the exterior material covering an electronic component main body to which metal terminals are connected, such that high withstand voltage performance is obtained. However, there is a disadvantage in that a creeping discharge is likely to occur due to leakage of an electric field generated in the electronic component to the surroundings, thus lowering the withstand voltage performance. In particular, when an object having charge or potential exists in the vicinity of the main body of the electronic component, the leakage electric field may increase. Furthermore, when the thickness of the exterior material becomes partially thin due to processing variations such as positional displacement of the electronic component body, the physical distance between the electronic component body and the outside becomes small, and the leakage electric field may become large. With the configuration of a preferred embodiment of the present invention, since the electrostatic shielding metal 200 is provided at a position between the surface of the exterior material 3 and the surface of the multilayer ceramic electronic component main body 2, leakage of an electric field to the outside is reduced or prevented by the electrostatic shielding effect. Therefore, creeping discharge is less likely to occur.

(2) In a multilayer ceramic electronic component according to a preferred embodiment of the present invention, the electrostatic shielding metal 200 covers at least a portion of a surface opposed to a mounting surface of a mounting board to which the multilayer ceramic electronic component 1 is to be mounted. The surface is one selected from the first main surface TS1, the second main surface TS2, the first lateral surface WS1, and the second lateral surface WS2 of the multilayer body 10. With such a configuration, it is possible to effectively reduce or prevent leakage of the electric field generated in the electronic component to the surroundings.

(3) In a multilayer ceramic electronic component according to a preferred embodiment of the present invention, the electrostatic shielding metal 200 is a tubular member that covers at least a portion of the first main surface TS1, at least a portion of the second main surface TS2, at least a portion of the first lateral surface WS1, and at least a portion of the second lateral surface WS2 of the multilayer body 10. With such a configuration, it is possible to more effectively reduce or prevent leakage of the electric field generated in the electronic component to the surroundings.

(4) In a multilayer ceramic electronic component according to a preferred embodiment of the present invention, the electrostatic shielding metal 200, which is the tubular member, includes a slit or a bonding portion provided along the length direction. With such a configuration, it is possible to provide a configuration that can be easily manufactured.

(5) In a multilayer ceramic electronic component according to a preferred embodiment of the present invention, the dimension L5 in the length direction of the electrostatic shielding metal 200 is longer than the dimension in the length direction of a portion exposed from the first external electrode 40A and the second external electrode 40B. With such a configuration, it is possible to more effectively reduce or prevent leakage of the electric field generated in the electronic component to the surroundings.

(6) In a multilayer ceramic electronic component according to a preferred embodiment of the present invention, the dimension L5 in the length direction of the electrostatic shielding metal 200 is longer than the dimension L0 in the length direction of the multilayer ceramic electronic component main body 2. With such a configuration, it is possible to more effectively reduce or prevent leakage of the electric field generated in the electronic component to the surroundings.

(7) In a multilayer ceramic electronic component according to a preferred embodiment of the present invention, the first metal terminal 100A and the second metal terminal 100B are each a metal terminal to be mounted on the mounting surface of the mounting board to which the multilayer ceramic electronic component 1 is to be mounted, the first main surface TS1 of the multilayer body 10 is a surface opposed to the mounting surface, the first external electrode 40A is provided at least on the first end surface LS1 side of the first main surface TS1, the second external electrode 40B is provided at least on the second end surface LS2 side of the first main surface TS1, the first metal terminal 100A includes the first bonding portion 110 that is opposed to the first main surface TS1 and connected to the first external electrode 40A, the first rising portion 120A that is connected to the first bonding portion 110A and extends away from the mounting surface, the first extension portion 130A that is connected to the first rising portion 120A and extends away from the multilayer ceramic electronic component main body 2, the first falling portion 140A that is connected to the first extension portion 130A and extends toward the mounting surface side, and the first mounting portion 150A that is connected to the first falling portion 140A and extends in a direction along the mounting surface, the second metal terminal 100B includes the second bonding portion 110B that is opposed to the first main surface TS1 and connected to the second external electrode 40B, the second rising portion 120B that is connected to the second bonding portion 110B and extends away from the mounting surface, the second extension portion 130B that is connected to the second rising portion 120B and extends away from the multilayer ceramic electronic component main body 2, the second falling portion 140B that is connected to the second extension portion 130B and extends toward the mounting surface side, and the second mounting portion 150B that is connected to the second falling portion 140B and extends in a direction along the mounting surface, in which the first extension portion 130A protrudes from the surface MTS1 on the first end surface LS1 side of the exterior material 3 and is partially exposed, and the second extension portion 130B protrudes from the surface MTS2 on the second end surface LS2 side of the exterior material and is partially exposed. By using such a first metal terminal 100A and a second metal terminal 100B, it is possible to lengthen the distance between the mounting board and the multilayer ceramic electronic component main body 2, and it is possible to relieve stress from the mounting board. Furthermore, it is possible to increase the thickness of the exterior material 3 provided on the mounting board side, such that the insulating property can be ensured.

(8) In a multilayer ceramic electronic component according to a preferred embodiment of the present invention, the dimension L5 in the length direction of the electrostatic shielding metal 200 is longer than the distance in the length direction between the bent portion B1 defining the connecting portion of the first bonding portion 110A and the first rising portion 120A, and the bent portion B2 defining the connecting portion of the second bonding portion 110B and the second rising portion 120B. With such a configuration, it is possible to more effectively reduce or prevent leakage of the electric field generated in the electronic component to the surroundings.

(9) In a multilayer ceramic electronic component according to a preferred embodiment of the present invention, the exterior material is a thermosetting epoxy resin. With such a configuration, adhesion between the exterior material 3, and the multilayer ceramic capacitor main body 2 and the metal terminal 100 can be improved, and it is possible to improve the withstand voltage and moisture resistance.

(10) In a multilayer ceramic electronic component according to a preferred embodiment of the present invention, the electrostatic shielding metal 200 is a metal plate. With such a configuration, it is possible to more effectively reduce or prevent leakage of the electric field generated in the electronic component to the surroundings. Furthermore, manufacturing is easy.

(11) In a multilayer ceramic electronic component according to a preferred embodiment of the present invention, the electrostatic shielding metal 200 includes two bent portions, and includes a member that covers three surfaces among the first main surface TS1, the second main surface TS2, the first lateral surface WS1, and the second lateral surface WS2 of the multilayer ceramic electronic component main body 2. With such a configuration, it is possible to more effectively reduce or prevent leakage of the electric field generated in the electronic component to the surroundings. Furthermore, manufacturing is easy.

(12) In a multilayer ceramic electronic component according to a preferred embodiment of the present invention, the electrostatic shielding metal 200 is a wire mesh. With such a configuration, it is possible to more effectively reduce or prevent leakage of the electric field generated in the electronic component to the surroundings. Furthermore, it is possible to reduce or prevent an increase in weight.

(13) In a multilayer ceramic electronic component according to a preferred embodiment of the present invention, the electrostatic shielding metal 200 is a metal thin film. With such a configuration, it is possible to more effectively reduce or prevent leakage of the electric field generated in the electronic component to the surroundings. Furthermore, it is possible to reduce or prevent an increase in size or an increase in weight.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer ceramic electronic component main body including a multilayer body, a first external electrode, and a second external electrode, the multilayer body including a plurality of ceramic layers and a plurality of internal conductive layers laminated on the ceramic layers, and further including a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, the first external electrode being provided on the first end surface side, and the second external electrode being provided on the second end surface side;
   a first metal terminal connected to the first external electrode; and
   a second metal terminal connected to the second external electrode;
   an exterior material covering the multilayer ceramic electronic component main body, a portion of the first metal terminal, and a portion of the second metal terminal; and
   an electrostatic shielding metal embedded in the exterior material and covering at least a portion of the multilayer ceramic electronic component main body; wherein
   the electrostatic shielding metal is provided between a surface of the exterior material and a surface of the multilayer ceramic electronic component main body, and is provided at a position spaced away from the multilayer ceramic electronic component main body; and
   a dimension in the length direction of the electrostatic shielding metal is longer than a dimension in the length direction of a portion exposed from the first external electrode and the second external electrode.

2. The multilayer ceramic electronic component according to claim 1, wherein the electrostatic shielding metal covers at least a portion of a surface opposed to a mounting surface of a mounting board to which the multilayer ceramic electronic component is to be mounted; and
the surface is one of the first main surface, the second main surface, the first lateral surface, and the second lateral surface of the multilayer body.

3. The multilayer ceramic electronic component according to claim 1, wherein the electrostatic shielding metal includes a tubular portion covering at least a portion of the first main surface, at least a portion of the second main surface, at least a portion of the first lateral surface, and at least a portion of the second lateral surface of the multilayer body.

4. The multilayer ceramic electronic component according to claim 3, wherein the tubular portion includes a slit or a bonding portion along the length direction.

5. The multilayer ceramic electronic component according to claim 1, wherein
the first metal terminal and the second metal terminal are each to be mounted on a mounting surface of a mounting board to which the multilayer ceramic electronic component is to be mounted;
the first main surface of the multilayer body is opposed to the mounting surface;
the first external electrode is provided at least on the first end surface side of the first main surface;
the second external electrode is provided at least on the second end surface side of the first main surface;
the first metal terminal includes:
a first bonding portion opposed to the first main surface and connected to the first external electrode;
a first rising portion connected to the first bonding portion and extending away from the mounting surface;
a first extension portion connected to the first rising portion and extending away from the multilayer ceramic electronic component main body;
a first falling portion connected to the first extension portion and extending toward the mounting surface side; and
a first mounting portion connected to the first falling portion and extending in a direction along the mounting surface;
the second metal terminal includes:
a second bonding portion opposed to the first main surface and connected to the second external electrode;
a second rising portion connected to the second bonding portion and extending away from the mounting surface;
a second extension portion connected to the second rising portion and extending away from the multilayer ceramic electronic component main body;
a second falling portion connected to the second extension portion and extending toward the mounting surface side; and
a second mounting portion connected to the second falling portion and extending in a direction along the mounting surface; wherein
the first extension portion protrudes from a surface on the first end surface side of the exterior material and is partially exposed; and
the second extension portion protrudes from a surface on the second end surface side of the exterior material and is partially exposed.

6. The multilayer ceramic electronic component according to claim 5, wherein a dimension in the length direction of the electrostatic shielding metal is longer than a distance in the length direction between a bent portion defining a connecting portion of the first bonding portion and the first rising portion, and a bent portion defining a connecting portion of the second bonding portion and the second rising portion.

7. The multilayer ceramic electronic component according to claim 1, wherein the exterior material includes a thermosetting epoxy resin.

8. The multilayer ceramic electronic component according to claim 1, wherein the electrostatic shielding metal includes a metal plate.

9. The multilayer ceramic electronic component according to claim 8, wherein the electrostatic shielding metal includes two bent portions, and a cover that covers three surfaces among the first main surface, the second main surface, the first lateral surface, and the second lateral surface of the multilayer ceramic electronic component main body.

10. The multilayer ceramic electronic component according to claim 1, wherein the electrostatic shielding metal includes a wire mesh.

11. The multilayer ceramic electronic component according to claim 1, wherein the electrostatic shielding metal includes a metal thin film.

12. A multilayer ceramic electronic component comprising:
a multilayer ceramic electronic component main body including a multilayer body, a first external electrode, and a second external electrode, the multilayer body including a plurality of ceramic layers and a plurality of internal conductive layers laminated on the ceramic layers, and further including a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, the first external electrode being provided on the first end surface side, and the second external electrode being provided on the second end surface side;
a first metal terminal connected to the first external electrode; and
a second metal terminal connected to the second external electrode;
an exterior material covering the multilayer ceramic electronic component main body, a portion of the first metal terminal, and a portion of the second metal terminal; and
an electrostatic shielding metal embedded in the exterior material and covering at least a portion of the multilayer ceramic electronic component main body; wherein
the electrostatic shielding metal is provided between a surface of the exterior material and a surface of the multilayer ceramic electronic component main body, and is provided at a position spaced away from the multilayer ceramic electronic component main body; and a dimension in the length direction of the electrostatic shielding metal is longer than a dimension in the length direction of the multilayer ceramic electronic component main body.

13. The multilayer ceramic electronic component according to claim 12, wherein
the electrostatic shielding metal covers at least a portion of a surface opposed to a mounting surface of a mounting board to which the multilayer ceramic electronic component is to be mounted; and
the surface is one of the first main surface, the second main surface, the first lateral surface, and the second lateral surface of the multilayer body.

14. The multilayer ceramic electronic component according to claim 12, wherein the electrostatic shielding metal includes a tubular portion covering at least a portion of the first main surface, at least a portion of the second main surface, at least a portion of the first lateral surface, and at least a portion of the second lateral surface of the multilayer body.

15. The multilayer ceramic electronic component according to claim 14, wherein the tubular portion includes a slit or a bonding portion along the length direction.

16. The multilayer ceramic electronic component according to claim 12, wherein
the first metal terminal and the second metal terminal are each to be mounted on a mounting surface of a mounting board to which the multilayer ceramic electronic component is to be mounted;
the first main surface of the multilayer body is opposed to the mounting surface;
the first external electrode is provided at least on the first end surface side of the first main surface;
the second external electrode is provided at least on the second end surface side of the first main surface;
the first metal terminal includes:
  a first bonding portion opposed to the first main surface and connected to the first external electrode;
  a first rising portion connected to the first bonding portion and extending away from the mounting surface;
  a first extension portion connected to the first rising portion and extending away from the multilayer ceramic electronic component main body;
  a first falling portion connected to the first extension portion and extending toward the mounting surface side; and
  a first mounting portion connected to the first falling portion and extending in a direction along the mounting surface;
the second metal terminal includes:
  a second bonding portion opposed to the first main surface and connected to the second external electrode;
  a second rising portion connected to the second bonding portion and extending away from the mounting surface;
  a second extension portion connected to the second rising portion and extending away from the multilayer ceramic electronic component main body;
  a second falling portion connected to the second extension portion and extending toward the mounting surface side; and
  a second mounting portion connected to the second falling portion and extending in a direction along the mounting surface; wherein
the first extension portion protrudes from a surface on the first end surface side of the exterior material and is partially exposed; and
the second extension portion protrudes from a surface on the second end surface side of the exterior material and is partially exposed.

17. The multilayer ceramic electronic component according to claim 16, wherein a dimension in the length direction of the electrostatic shielding metal is longer than a distance in the length direction between a bent portion defining a connecting portion of the first bonding portion and the first rising portion, and a bent portion defining a connecting portion of the second bonding portion and the second rising portion.

18. The multilayer ceramic electronic component according to claim 12, wherein the exterior material includes a thermosetting epoxy resin.

19. The multilayer ceramic electronic component according to claim 12, wherein the electrostatic shielding metal includes a metal plate.

20. The multilayer ceramic electronic component according to claim 19, wherein the electrostatic shielding metal includes two bent portions, and a cover that covers three surfaces among the first main surface, the second main surface, the first lateral surface, and the second lateral surface of the multilayer ceramic electronic component main body.

* * * * *